US012701472B2

(12) United States Patent
Zhou et al.

(10) Patent No.: US 12,701,472 B2
(45) Date of Patent: Aug. 4, 2026

(54) WIRELESS COMMUNICATION METHOD, STATION DEVICE, AND ACCESS POINT DEVICE

(71) Applicant: GUANGDONG OPPO MOBILE TELECOMMUNICATIONS CORP., LTD., Dongguan (CN)

(72) Inventors: Pei Zhou, Dongguan (CN); Lei Huang, Singapore (SG); Chaoming Luo, Dongguan (CN); Liuming Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 310 days.

(21) Appl. No.: 18/396,487

(22) Filed: Dec. 26, 2023

(65) Prior Publication Data

US 2024/0137822 A1 Apr. 25, 2024

Related U.S. Application Data

(63) Continuation of application No. PCT/CN2021/107696, filed on Jul. 21, 2021.

(51) Int. Cl.
*H04W 36/00* (2009.01)
*H04W 36/08* (2009.01)

(52) U.S. Cl.
CPC ....... *H04W 36/0077* (2013.01); *H04W 36/08* (2013.01)

(58) Field of Classification Search
CPC . H04W 36/0077; H04W 36/08; H04W 48/02; H04W 84/12; H04L 12/28
See application file for complete search history.

(56) References Cited

U.S. PATENT DOCUMENTS 7,890,745 B2 * 2/2011 Qi ........................ H04W 12/106
455/410
2007/0213029 A1 * 9/2007 Edney ................. H04L 12/4641
455/456.2

(Continued)

FOREIGN PATENT DOCUMENTS

CN 1756206 A 4/2006
CN 103190195 A 7/2013

(Continued)

OTHER PUBLICATIONS

International Search Report in the international application No. PCT/CN2021/107696, mailed on Apr. 28, 2022. 5 pages with English translation.

(Continued)

*Primary Examiner* — Michael A Keller
(74) *Attorney, Agent, or Firm* — Bayes PLLC

(57) ABSTRACT

A wireless communication method, a station device, and an access point device. The method includes: a station device sending a first request frame to a first access point device, wherein the first request frame includes first indication information and/or second indication information. The first indication information is used for indicating whether the station device requests that the first access point device transfers national security and emergency preparedness (NSEP) priority access license information to a second access point device; the second indication information is used for indicating whether the station device requests the acquisition of an enhanced distributed channel access (EDCA) parameter set; the first access point device is an access point device that is currently associated with the station device; and the second access point device is a target access point device that is to be associated with the station device.

20 Claims, 32 Drawing Sheets

100

(56) References Cited

U.S. PATENT DOCUMENTS

| | | | | |
|---|---|---|---|---|
| 2009/0135776 A1* | 5/2009 | Sashihara | ............ | H04W 28/26 |
| | | | | 370/329 |
| 2011/0151885 A1 | 6/2011 | Buyukkoc | | |
| 2011/0225272 A1* | 9/2011 | Montemurro | ......... | H04W 28/24 |
| | | | | 709/221 |
| 2012/0063433 A1 | 3/2012 | Wentink | | |
| 2013/0250834 A1* | 9/2013 | Seok | ................... | H04W 12/069 |
| | | | | 370/311 |
| 2014/0105196 A1* | 4/2014 | Seok | ....................... | H04W 4/70 |
| | | | | 370/338 |
| 2014/0273958 A1* | 9/2014 | Messana | ............ | H04L 63/0892 |
| | | | | 455/411 |
| 2015/0162969 A1 | 6/2015 | Wentink | | |
| 2018/0035292 A1* | 2/2018 | Soundararajan | ...... | H04L 67/303 |
| 2021/0144778 A1* | 5/2021 | Cherian | .................. | H04W 4/90 |
| 2021/0360646 A1* | 11/2021 | Chu | .................... | H04W 72/569 |
| 2022/0124855 A1* | 4/2022 | Hu | ........................ | H04W 76/34 |
| 2022/0240264 A1* | 7/2022 | Chu | ...................... | H04W 12/06 |
| 2022/0361193 A1* | 11/2022 | Fang | ...................... | H04W 4/90 |
| 2022/0377554 A1* | 11/2022 | Henry | ................... | H04W 12/03 |
| 2024/0137822 A1* | 4/2024 | Zhou | ...................... | H04W 36/08 |
| 2026/0006479 A1* | 1/2026 | Tian | ...................... | H04W 24/10 |

FOREIGN PATENT DOCUMENTS

| | | | | | |
|---|---|---|---|---|---|
| CN | 105491625 A | | 4/2016 | | |
| CN | 109151956 A | | 1/2019 | | |
| CN | 111586725 A | | 8/2020 | | |
| KR | 20150052420 A | * | 5/2015 | ............ | H04W 84/12 |
| KR | 20210004869 A | * | 1/2021 | ............ | H04W 76/15 |
| WO | WO-2013005908 A1 | * | 1/2013 | ............ | H04W 60/00 |
| WO | WO-2013085366 A1 | * | 6/2013 | ............ | H04W 28/20 |
| WO | WO-2013122395 A1 | * | 8/2013 | ............ | H04W 48/20 |
| WO | WO-2013122396 A1 | * | 8/2013 | ............ | H04W 48/14 |
| WO | WO-2013122398 A1 | * | 8/2013 | ............ | H04W 48/16 |
| WO | WO-2014030894 A1 | * | 2/2014 | ............ | H04W 48/14 |
| WO | WO-2014069867 A1 | * | 5/2014 | ............ | H04W 48/14 |
| WO | WO-2014069870 A1 | * | 5/2014 | ............ | H04W 56/00 |
| WO | WO-2015138750 A1 | * | 9/2015 | ............ | H04W 48/14 |
| WO | WO-2016011337 A1 | * | 1/2016 | ......... | H04W 72/541 |
| WO | WO-2020222583 A1 | * | 11/2020 | ........ | H04W 74/0808 |
| WO | WO-2020222584 A1 | * | 11/2020 | ............ | H04W 24/08 |
| WO | WO-2020222585 A1 | * | 11/2020 | ............ | H04W 72/12 |
| WO | WO-2020226462 A1 | * | 11/2020 | ....... | H04W 74/0866 |
| WO | WO-2022132030 A1 | * | 6/2022 | ......... | H04W 74/002 |

OTHER PUBLICATIONS

Written Opinion of the International Search Authority in the international application No. PCT/CN2021/107696, mailed on Apr. 28, 2022. 8 pages with English translation.

"IEEE Standard for Information Technology—Telecommunications and Information Exchange between Systems Local and Metropolitan Area Networks Specific Requirements, Part 11: Wireless LAN Medium Access Control (MAC) and Physical Layer (PHY) Specifications", IEEE Std 802.11™-2020, Developed by the LAN/MAN Standards Committee of the IEEE Computer Society, Approved Dec. 3, 2020, pp. 2617-2619, pp. 2326-2327. 4379 pages.

"IEEE P802.11be™/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)", Prepared by the 802.11 Working Group of the LAN/MAN Standards Committee of the IEEE Computer Society, IEEE P802.11be/D1.0, May 2021, pp. 305-309. 635 pages.

First Office Action of the Chinese application No. 202180096017.X, issued on Dec. 25, 2025.

* cited by examiner

100

110

120

120

200

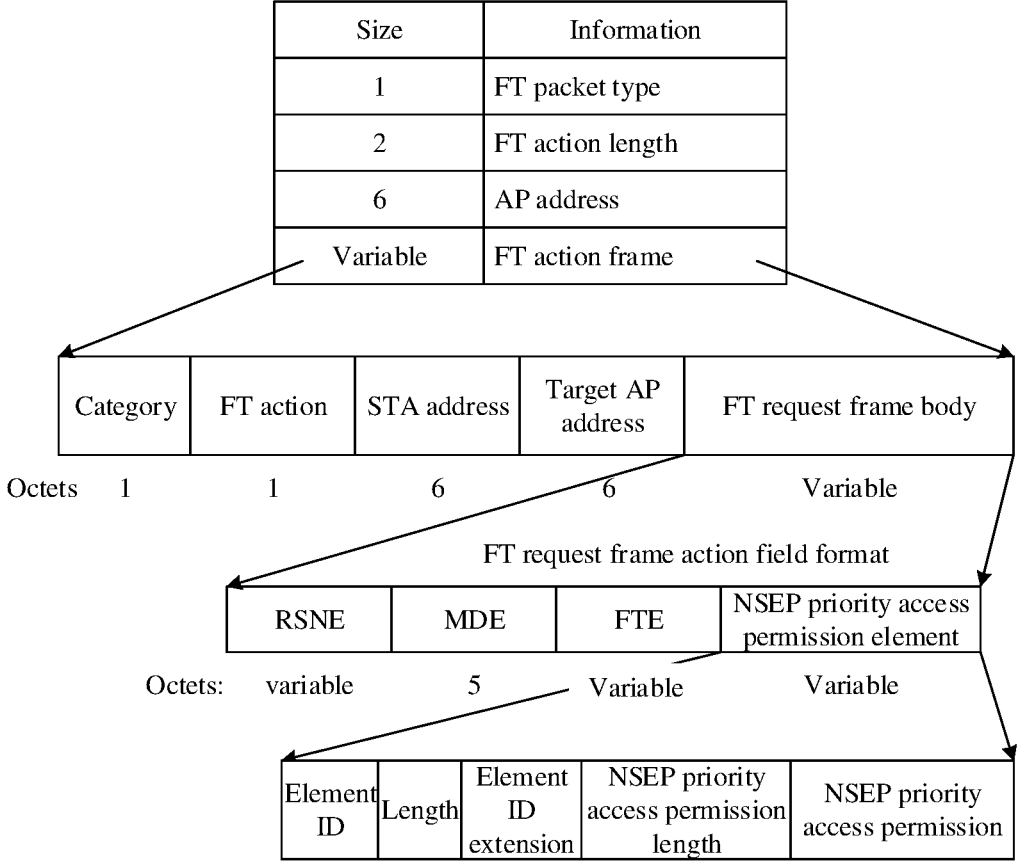

| Size | Information |
|------|-------------|
| 1 | FT packet type |
| 2 | FT action length |
| 6 | AP address |
| Variable | FT action frame |

| Category | FT action | STA address | Target AP address | FT request frame body |
|----------|-----------|-------------|-------------------|------------------------|

Octets    1    1    6    6    Variable

FT request frame action field format

| RSNE | MDE | FTE | NSEP priority access permission element |
|------|-----|-----|------------------------------------------|

Octets:    variable    5    Variable    Variable

| Element ID | Length | Element ID extension | NSEP priority access permission length | NSEP priority access permission |
|------------|--------|----------------------|----------------------------------------|----------------------------------|

FIG. 12

| Size | Information |
|------|-------------|
| 1 | FT packet type |
| 2 | FT action length |
| 6 | AP address |
| Variable | FT action frame |

| Category | FT action | STA address | Target AP address | FT request frame body |
|----------|-----------|-------------|-------------------|----------------------|

Octets    1      1       6       6      Variable

FT request frame action field format

| RSNE | MDE | FTE | NSEP priority access permission length | NSEP priority access permission |
|------|-----|-----|----------------------------------------|--------------------------------|

Octets   Variable   5   Variable   1 or variable   Variable

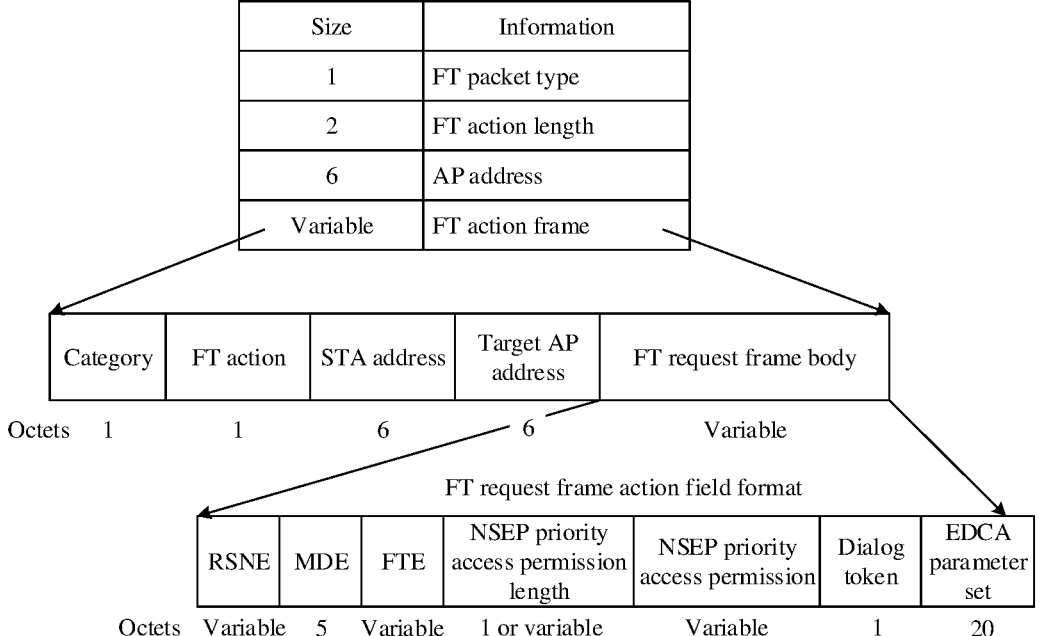

| Size | Information |
|---|---|
| 1 | FT packet type |
| 2 | FT action length |
| 6 | AP address |
| Variable | FT action frame |

| Category | FT action | STA address | Target AP address | FT request frame body |
|---|---|---|---|---|

Octets    1        1        6        6        Variable

FT request frame action field format

| RSNE | MDE | FTE | NSEP priority access permission length | NSEP priority access permission | Dialog token | EDCA parameter set |
|---|---|---|---|---|---|---|

Octets    Variable    5    Variable    1 or variable    Variable    1    20

FIG. 15

| Size | Information |
|------|-------------|
| 1 | FT packet type |
| 2 | FT action length |
| 6 | AP address |
| Variable | FT action frame |

| Category | FT address | STA address | Target AP address | Status code | FT response frame body |
|----------|-----------|-------------|-------------------|-------------|------------------------|

Octets    1        1        6        6        2        Variable

FT response frame action field format

| RSNE | MDE | FTE | NSEP priority access permission response (status code) |
|------|-----|-----|--------------------------------------------------------|

Octets    Variable       5       Variable       1

| Size | Information |
|------|-------------|
| 1 | FT packet type |
| 2 | FT action length |
| 6 | AP address |
| Variable | FT action frame |

| Category | FT address | STA address | Target AP address | Status code | FT response frame body |
|----------|------------|-------------|-------------------|-------------|------------------------|

Octets     1          1          6          6          2          Variable

FT response frame action field format

| RSNE | MDE | FTE | Dialog token | NSEP priority access permission response (status code) | EDCA parameter set |
|------|-----|-----|--------------|--------------------------------------------------------|--------------------|

Octets   Variable    5    Variable    1          1          20

| Category | FT action | STA address | Target AP address | Status code | FT response frame body |
|---|---|---|---|---|---|

Octets    1        1        6        6        2        Variable

FT response frame action field format

| RSNE | MDE | FTE | Dialog token | NSEP priority access permission response (status code) | EDCA parameter set |
|---|---|---|---|---|---|

Octets   Variable    5    Variable    1        1        20

<u>800</u>

STA device 1000

Communication unit
1010

FIG. 26

AP device 1100

Communication unit
1110

FIG. 27

AP device 1200

Communication unit
1210

FIG. 28

AP device 1300

Communication unit
1310

FIG. 29

WIRELESS COMMUNICATION METHOD, STATION DEVICE, AND ACCESS POINT DEVICE

CROSS-REFERENCE TO RELATED APPLICATION

This application is a continuation of International Patent Application No. PCT/CN2021/107696 filed on Jul. 21, 2021, the content of which is hereby incorporated by reference in its entirety.

BACKGROUND

In some scenarios, a National Security and Emergency Preparedness (NSEP) priority access mechanism is introduced, and an NSEP priority access permission mechanism allows an authorized user to preferentially use system resources, thereby improving a probability of successful communication for the user in a network congestion condition. However, there are still some improvements that can be made to an existing NSEP priority access permission mechanism. For example, when a terminal device performs AP transition, how to implement an NSEP priority access service needs to be improved.

SUMMARY

Embodiments of the disclosure relate to the communication field, and in particular to a method for wireless communication, a station (STA) device, and an Access Point (AP) device. The AP device currently associated with the STA device may transfer NSEP priority access permission of the STA device to a target AP device in a process of performing AP transition by the STA device, so that the transition overhead can be reduced, and the target AP device may verify the STA device in advance according to the NSEP priority access permission of the STA device, thereby reducing delay of an NSEP priority access service.

According to a first aspect, a method for wireless communication is provided, and the method includes the following operations. An STA device sends a first request frame to a first AP device. The first request frame includes at least first indication information or second indication information. The first indication information is configured to indicate whether the STA device requests the first AP device to transfer NSEP priority access permission of the STA device to a second AP device. The second indication information is configured to indicate whether the STA device requests for acquiring an Enhanced Distributed Channel Access (EDCA) parameter set. The first AP device is an AP device currently associated with the STA device. The second AP device is a target AP device to be associated with the STA device.

According to a second aspect, a method for wireless communication is provided, and the method includes the following operations. A first AP device sends NSEP priority access permission of an STA device to a second AP device. The first AP device is an AP device currently associated with the STA device, and the second AP device is a target AP device to be associated with the STA device.

According to a third aspect, a method for wireless communication is provided, and the method includes the following operations. A second AP device receives NSEP priority access permission of an STA device sent by a first AP device. The first AP device is an AP device currently associated with the STA device, and the second AP device is a target AP device to be associated with the STA device.

According to a fourth aspect, a method for wireless communication is provided, and the method includes the following operations. An AP device acquires NSEP priority access permission information of an STA device, and determines dot11NonAPStationAuthNSEPPriorityAccesstype of the STA device in dot11InterworkingEntry according to the NSEP priority access service information of the STA device.

According to a fifth aspect, a method for wireless communication is provided, and the method includes the following operations. An STA device receives a target status code sent by a first AP device. The target status code is configured to indicate a state related to NSEP priority access. The first AP device is an AP device currently associated with the STA device. The STA device determines whether to initiate a request for NSEP priority access according to the target status code.

According to a sixth aspect, an STA device is provided, and the STA device is configured to execute the method of the first aspect or various implementations thereof, or the method of the fifth aspect or various implementations thereof.

Specifically, the STA device includes functional modules configured to execute the method of the first aspect or various implementations thereof, or the method of the fifth aspect or various implementations thereof.

According to a seventh aspect, an AP device is provided, and the AP device is configured to execute the method of the second aspect or various implementations thereof. Specifically, the AP device includes functional modules configured to execute the method of any one of the second aspect to the fourth aspect or various implementations thereof.

According to an eighth aspect, an STA device is provided, and the STA device includes a memory and a processor. The memory is configured to store a computer program. The processor is configured to call and run the computer program stored in the memory, so as to execute the method of the first aspect or various implementations thereof, or the method of the fifth aspect or various implementations thereof.

According to a ninth aspect, an AP device is provided, and the AP device includes a memory and a processor. The memory is configured to store a computer program. The processor is configured to call and run the computer program stored in the memory, so as to execute the method of any one of the second aspect to the fourth aspect or various implementations thereof.

According to a tenth aspect, a chip is provided, and the chip is configured to implement the method of any one of the first aspect to the fifth aspect or various implementations thereof.

Specifically, the chip includes a processor, and the processor is configured to call and run a computer program from a memory, so that a device installed with the chip executes the method of any one of the first aspect to the fifth aspect or various implementations thereof.

According to an eleventh aspect, a computer-readable storage medium is provided. The computer-readable storage medium is configured to store a computer program, and the computer program causes a computer to execute the method of any one of the first aspect to the fifth aspect or various implementations thereof.

According to a twelfth aspect, a computer program product is provided, and the computer program product includes computer program instructions. The computer program instructions cause a computer to execute the method of any one of the first aspect to the fifth aspect or various implementations thereof.

According to a thirteenth aspect, a computer program is provided, and the computer program causes a computer to execute the method of any one of the first aspect to the fifth aspect or various implementations thereof when the computer program is run on the computer.

BRIEF DESCRIPTION OF THE DRAWINGS

FIG. 12 to FIG. 15 are format diagrams of a remote request frame according to an embodiment of the disclosure.

FIG. 26 is a block diagram of an STA device according to an embodiment of the disclosure.

FIG. 27 is a block diagram of an AP device according to an embodiment of the disclosure.

FIG. 28 is a block diagram of another AP device according to an embodiment of the disclosure.

FIG. 29 is a block diagram of yet another AP device according to an embodiment of the disclosure.

DETAILED DESCRIPTION

The technical solutions in the embodiments of the disclosure would be described below with reference to the drawings in the embodiments of the disclosure. It is apparent that the described embodiments are part of the embodiments of the disclosure, rather than all of the embodiments. With respect to the embodiments of the disclosure, all other embodiments obtained by those of ordinary skill in the art without any creative efforts belong to the scope of protection of the disclosure.

The technical solutions of the embodiments of the disclosure may be applied to various communication systems, such as a Wireless Local Area Network (WLAN), Wireless Fidelity (Wi-Fi), or other communication systems, etc.

Exemplarily, a communication system 100 to which embodiments of the disclosure are applied is shown in FIG.

1. The communication system 100 may include an Access Point (AP) device 110 and a station (STA) device 120 accessing a network through the AP device 110.

In the embodiments of the disclosure, the STA device may be deployed on the land, including indoor or outdoor, handheld, worn or vehicle-mounted; or the STA device may be deployed in the water (such as a ship, etc.); or the STA device may be deployed in the air (such as an aircraft, a balloon, a satellite, etc.).

In the embodiments of the disclosure, the STA device may be a mobile phone, a pad, a computer with a wireless transceiver function, a Virtual Reality (VR) device, an Augmented Reality (AR) device, a wireless device in industrial control, a wireless device in self driving, a wireless device in remote medical, a wireless device in a smart grid, a wireless device in transportation safety, a wireless device in a smart city, or a wireless device in a smart home, etc.

As an example rather than limitation, in the embodiments of the disclosure, the STA device may also be a wearable device. The wearable device may also be referred to as a wearable smart device, which is a general term for wearable devices developed by applying wearable technologies to intelligently design daily wears, such as glasses, gloves, watches, clothing, shoes, etc. The wearable device is a portable device which is directly worn on the body or integrated into a user's clothing or accessory. The wearable device is not only a hardware device, but also achieves powerful functions through supporting of software, data interaction and cloud-based interaction. Generalized wearable smart devices include devices with full functions, large sizes, implementing complete or partial functions without relying on smart phones, such as smart watches or smart glasses, etc., and devices focusing on only a certain type of application functions and requiring cooperation with other devices such as smart phones in use, such as various smart bracelets for monitoring physical signs, smart jewelry, etc.

Figure 1:
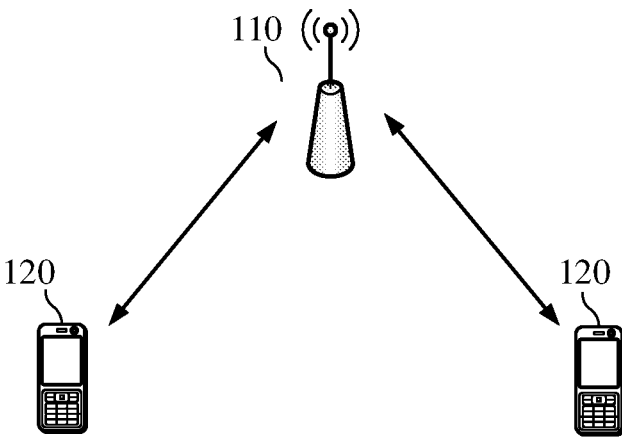
FIG. 1 is a diagram of an architecture of a communication system according to an embodiment of the disclosure.

FIG. 1 exemplarily shows one AP and two STAs. Optionally, the communication system 100 may include multiple APs and other numbers of STAs, which are not limited in the embodiments of the disclosure.

It should be understood that in the embodiments of the disclosure, a device with a communication function in a network/system may be referred to as a communication device. The communication system 100 shown in FIG. 1 is taken as an example, the communication device may include an AP 110 and a STA 120 with communication functions, and the AP 110 and the STA 120 may be the above specific devices respectively, which are not be elaborated here. The communication device may also include other devices in the communication system 100, such as a network controller, a gateway and other network entities, which are not limited in the embodiments of the disclosure.

It should be understood that in the disclosure, terms "system" and "network" are often interchangeably used here. In the disclosure, a term "and/or" is only an association relationship describing associated objects, and indicates that there may be three relationships. For example, A and/or B may indicate three situations, i.e., A exists alone, A and B exist simultaneously, and B exists alone. Furthermore, in the disclosure, a character "/" generally indicates that anterior and posterior associated objects are in a "or" relationship.

It should be understood that the "indication" mentioned in the embodiments of the disclosure may be a direct indication, or may be an indirect indication, or may indicate that there is an association relationship. For example, A indicates B, which may mean that A directly indicates B, for example, B may be obtained through A; or may mean that A indirectly indicates B, for example, A indicates C, and B may be obtained through C; or may indicate that there is an association relationship between A and B.

Terms used in sections of the embodiments of the disclosure are only intended to explain specific embodiments of the disclosure, and are not intended to limit the disclosure. Terms "first", "second", "third", "fourth" or the like in the description, claims and the drawings of the disclosure are intended to distinguish different objects, and are not intended to describe a specific order. Furthermore, terms "include", "have" as well as any variations thereof, are intended to cover a non-exclusive inclusion.

In descriptions of the embodiments of the disclosure, a term "corresponding" may indicate that there are direct or indirect correspondences between two items, or may indicate that there is an association relationship between two items, or may be a relationship such as indicating and indicated, configuring and configured, etc.

In the embodiments of the disclosure, "predefined" or "preconfigured" may be implemented by pre-saving corresponding codes, tables or other manners which may be used to indicate related information in a device (for example, including a STA and an AP), specific implementations thereof are not limited in the disclosure. For example, "predefined" may refer to defined in a protocol.

In the embodiments of the disclosure, "protocol" may refer to a standard protocol in the communication field, for example, it may include a Wi-Fi protocol and related protocols applied to future Wi-Fi communication systems, which are not limited in the disclosure.

A National Security and Emergency Preparedness (NSEP) priority access mechanism (NSEP priority access) allows an authorized user to preferentially use system resources, thereby improving a probability of successful communication for the user in a network congestion condition. It may include two steps as follows.

1. Verifying an Authorized User of an NSEP Priority Access Service.

For example, the AP interacts with an external network through a subscription service provider network interface (SSPN) for the authentication and provisioning services to the user. However, an interaction protocol for authentication information and service information between the AP and the SSPN is not defined in an Institute of Electrical and Electronics Engineers (IEEE) 802.11 standard.

After obtaining verification information and service information of the STA from the SSPN, the AP stores the verification information and the service information in a local management information base (MIB) of the AP. Specifically, the AP creates information known as dot11InterworkingEntry for each successfully associated STA (associated STA), and dot11InterworkingEntry of all the successfully associated STAs constitute dot11InterworkingTable stored in the MIB.

At a stage of associating the STA with the AP, the AP uses an interworking procedure to retrieve NSEP priority access permission used by the STA from an NSEP service provider through the SSPN interface. After successfully acquiring the NSEP priority access permission used by the STA, the AP updates dot11NonAPStationAuthNSEPPriorityAccesstype of the STA in the dot11InterworkingEntry of the MIB of the provisioning service.

When AP transition is performed in a same Extended Service Set (ESS), if the STA successfully completes the AP transition, authorization information in the dot11InterworkingEntry (i.e., dot11NonAPStationAuthNSEPPriorityAccesstype) may be transmitted from an old AP to a new AP. Then, the AP verifies the NSEP priority access permission of the STA at a stage of setting the NSEP priority access mechanism. However, how to transmit the authorization information is not defined in the IEEE 802.11 standard at present.

2. Setting the NSEP Priority Access.

An NSEP priority access setting mechanism allows the STA to be used as an originator and the AP to be used as a recipient; and also allows the AP to be used as an originator and the STA to be used as a recipient.

First Case: The STA is Used as an Originator, and the AP is Used as a Recipient.

Figure 2:
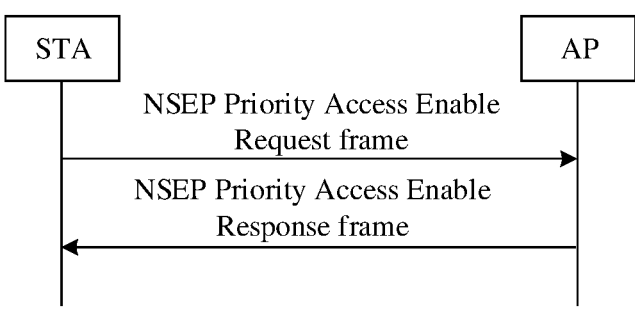
FIG. 2 is a diagram of an NSEP priority access setting mechanism in the related art.

As shown in FIG. 2, firstly, the STA sends an NSEP Priority Access Enable Request frame to request enabling the NSEP priority access. The AP verifies the authorization information of the STA and replies with an NSEP Priority Access Enable Response frame which includes a status code field and an Enhanced Distributed Channel Access (EDCA) parameter set element. The status code indicates whether the NSEP priority access is successfully enabled, and the EDCA parameter set element is configured to set EDCA parameters such as a Minimum Contention Window (CWmin[AC]), a Maximum Contention Window (CWmax[AC]), an Arbitration Interframe Space Number (AIFSN[AC]), a Transmission Opportunity Limit (TXOP_Limit[AC]), etc., to a non-AP STA.

Second Case: The AP is Used as an Originator, and the STA is Used as a Recipient.

Firstly, the AP sends an NSEP Priority Access Enable Request frame to request the STA to enable the NSEP priority access, and an EDCA parameter set element included in the frame is configured to set state variables CWmin[AC], CWmax[AC], AIFSN[AC] and TXOP_Limit[AC] to the STAs. The STA replies with an NSEP Priority Access Enable Response frame in which a status code is included to indicate whether the NSEP priority access is successfully enabled.

Table 1 and Table 2 are formats of the NSEP Priority Access Enable Request frame and the NSEP Priority Access Enable Response frame respectively.

TABLE 1

| Order | Meaning |
| --- | --- |
| 1 | Category |
| 2 | Extreme High Throughout (EHT) |
| 3 | Dialog token |
| 4 | EDCA parameter set element |

TABLE 2

| Order | Meaning |
| --- | --- |
| 1 | Category |
| 2 | Protected EHT |
| 3 | Dialog token |
| 4 | EDCA parameter set element |
| 5 | Status Code |

Figure 3:
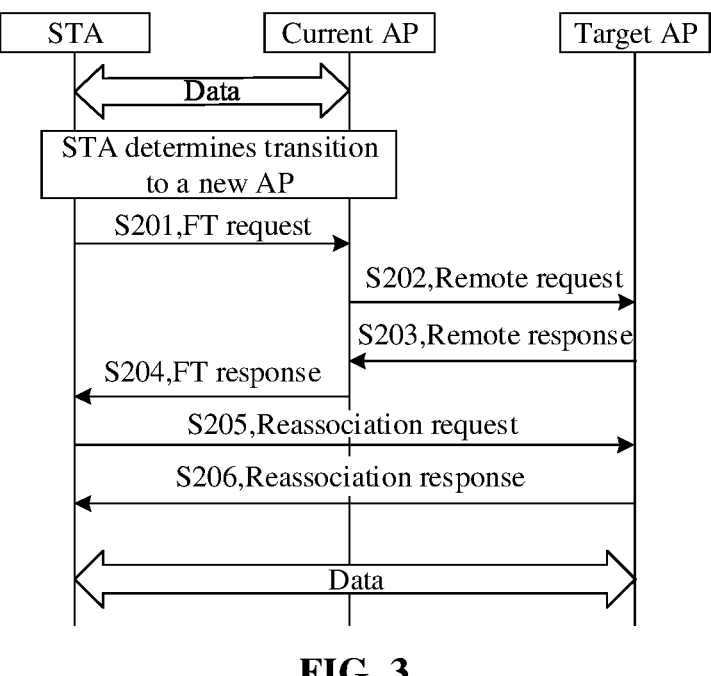
FIG. 3 is an interaction diagram of a Fast basic service set Transition (FT) mechanism in the related art.

FIG. 3 is a flowchart of performing fast BSS transition using a Fast basic service set (BSS) Transition (FT) mechanism.

In an initial state, a Fast BSS Transition Originator (FTO) (a STA) is associated with a current AP for service transmission, and in response to that the FTO determines that it requires transition to another new AP (for example, transition due to movement), the following operations S1 to S6 may be performed.

At S201, the FTO sends an FT request frame to the current AP to request the AP transition.

The FT request frame includes a Media Access Control (MAC) address of a target AP.

At S202, the current AP informs the target AP through a remote request frame that the STA wants transition to the target AP.

At S203, the target AP informs the current AP through a status code of a remote response frame of whether the transition of the STA is allowed.

At S204, the current AP forwards a result from the target AP to the STA through an FT response frame.

At S205, when permission of the transition is obtained, the STA sends a reassociation request frame to the target AP for reassociation.

At S206, the target AP replies with a reassociation response frame to respond to the reassociation request from the STA.

Through the above operations, the STA completes the AP transition, and is successfully associated with the target AP for the service transmission.

In summary, the NSEP priority access mechanism does not define a data format and update method of the NSEP priority access permission, so that a problem may occur when the AP performs NSEP priority access permission verification, the NSEP priority access permission cannot be verified, and the NSEP priority access permission cannot be updated. Therefore, the data format and update method of the NSEP priority access permission need to be defined.

Furthermore, an operation of the STA after receiving the status code related to the NSEP priority access permission fed back by the AP is unclear, and thus the operation of the STA after receiving the status code related to the NSEP priority access fed back by the AP needs to be designed.

Furthermore, when the STA performs the AP transition, the NSEP priority access mechanism does not design a specific transfer protocol and does not design a fast transition mechanism, and the NSEP priority access service after the AP transition has a large delay for the STA that needs to perform the NSEP priority access service. Therefore, it is necessary to provide a fast transition mechanism for the NSEP priority access service.

In order to facilitate understanding the technical solutions of the embodiments of the disclosure, the technical solutions of the disclosure are described in detail below with reference to specific embodiments. The above related art, as optional solutions, may be arbitrarily combined with the technical solutions of the embodiments of the disclosure, all of which fall within a scope of protection of the embodiments of the disclosure. The embodiments of the disclosure include at least a part of the following contents.

Figure 4:
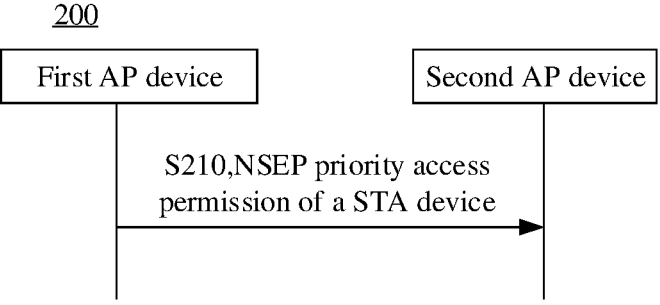
FIG. 4 is an interaction diagram of a method for wireless communication according to an embodiment of the disclosure.

FIG. 4 is an interaction diagram of a method 200 for wireless communication according to an embodiment of the disclosure. As shown in FIG. 4, the method 200 includes the following contents.

At S210, a first AP device sends NSEP priority access permission of an STA device to a second AP device. The first AP device is an AP device currently associated with the STA device, and the second AP device is a target AP device to be associated with the STA device. Alternatively, the second AP device is a target AP device reassociated with the STA device.

That is, the first AP device is a current AP, and the second AP device is a target AP.

It should be understood that in the embodiment of the disclosure, the STA device may be a non-AP, or a non-AP Multi-Link Device (MLD), or a non-AP EHT STA. The disclosure does not specifically define types of the STA.

It should be understood that in the embodiment of the disclosure, the AP device (such as the first AP device, the second AP device) may be a non-MLD AP or an AP MLD, and the disclosure does not specifically define types of the AP.

In some embodiments, the NSEP priority access permission may include dot11NonAPStationAuthNSEPPriorityAccesstype.

In some embodiments, the dot11NonAPStationAuthNSEPPriorityAccesstype of the STA device belongs to dot11InterworkingEntry associated with the STA device, and the dot11InterworkingEntry associated with the STA device is stored in a MIB of the first AP device.

In some embodiments of the disclosure, the first AP device sends the NSEP priority access permission of the STA device to the second AP device through state transfer of an interworking procedure.

In some embodiments, the first AP device may also transfer other information in the dot11InterworkingEntry of the STA device except the dot11NonAPStationAuthNSEPPriorityAccesstype to the second AP device through the state transfer of the interworking procedure. That is, the first AP device may transfer part or all of the dot11InterworkingEntry through the state transfer of the interworking procedure.

In some other embodiments of the disclosure, the first AP device may also send the NSEP priority access permission of the STA device to the second AP device in other interaction manners.

For example, the first AP device sends a second request frame to the second AP device, and the second request frame includes the NSEP priority access permission of the STA device.

In some embodiments, the second request frame may be a frame sent by the current AP to the target AP in the FT transition. As an example, the second request frame is a remote request frame.

That is, the current AP may transfer the NSEP priority access permission of the STA to the target AP during the FT transition.

Further, the target AP may verify an NSEP priority access authority for the STA based on the priority access permission of the STA to determine whether the STA device has the NESP priority access authority.

In some embodiments of the disclosure, the method 200 further includes the following operations.

The first AP device receives a first request frame sent by the STA device, and the first request frame includes at least first indication information or second indication information. The first indication information is configured to indicate whether the STA device requests the first AP device to transfer the NSEP priority access permission of the STA device to the second AP device, and the second indication information is configured to indicate whether the STA device requests for acquiring an EDCA parameter set.

It should be understood that the second indication information is configured to indicate whether the STA device requests for acquiring the EDCA parameter set, which may refer to whether the STA device has a requirement for acquiring the EDCA parameter set. The EDCA parameter set may be determined by the first AP device or the second AP device, which is not limited in the disclosure.

Optionally, in some other embodiments, the second indication information may also be configured to indicate whether the STA device requests the first AP device to transfer the EDCA parameter set to the second AP device. Here, the EDCA parameter set may be an EDCA parameter set used by the first AP device and the STA device to perform the NESP priority access service.

It should be understood that in the embodiments of the disclosure, the EDCA parameter set may include EDCA parameters such as CWmin[AC], CWmax[AC], AIFSN [AC], TXOP_Limit[AC], etc.

In some embodiments, a status code (such as SUCCESS, which would be described below), which is set when the first AP device and the STA device perform NSEP priority access setting, indicates that the first indication information is configured to indicate that the STA device requests the first AP device to transfer the NSEP priority access permission of the STA device to the second AP device in response to that the STA device has the NSEP priority access authority.

In some other embodiments, a status code (such as NSEP_DENIED_UNAUTHORIZED, which would be described below), which is set when the first AP device and the STA device perform the NSEP priority access setting, indicates that the first indication information is configured to indicate that the STA device does not request the first AP device to transfer the NSEP priority access permission of the STA device to the second AP device in response to that the STA device does not have the NSEP priority access authority.

That is, the STA device may indicate whether to request transfer of the NSEP priority access information by means of the first indication information.

Alternatively, the first indication information is carried in the first request frame when the STA device requests the first AP device to transfer the NSEP priority access permission of the STA device to the second AP device, and the first indication information is not carried in the first request frame when the STA device does not request the first AP device to transfer the NSEP priority access permission of the STA device to the second AP device. In this manner, the STA device may indicate whether the STA device requests the first AP device to transfer NSEP priority access permission of the STA device to the second AP device. Specific indication manners are not limited in the disclosure, and similar manners are applied to other indication information, which are not elaborated here.

In some embodiments, the first request frame may be a frame sent by the STA to the current AP in the FT transition. As an example, the first request frame is an FT request frame.

In some embodiments, the second request frame sent by the first AP device is sent based on the first request frame.

For example, in case that the STA device requests the first AP device to transfer the NSEP priority access permission of the STA device to the second AP device, the first AP device sends the second request frame to the second AP device, and transfers the NSEP priority access permission of the STA device to the second AP device through the second request frame.

For another example, in an FT transition mechanism, the first AP device may also decide by itself to transfer the NSEP priority access permission of the STA device to the second AP device, a triggering manner for the first AP device to transfer the NSEP priority access permission of the STA device is not limited in the embodiments of the disclosure. As an example, in case that the status code set when the first AP device and the STA device perform the NSEP priority access setting is SUCCESS, the first AP device decides to transfer the NSEP priority access permission of the STA device to the second AP device.

In some embodiments of the disclosure, the second request frame may further include at least third indication information or a first EDCA parameter set, and the third indication information is configured to indicate whether the STA device requests an EDCA parameter set.

That is, the first AP device may transfer a requirement of the STA device on the EDCA parameter set to the second AP device, or may send a suggested EDCA parameter set to the second AP device. The suggested EDCA parameter set may be an EDCA parameter set used by the NSEP priority access service between the first AP device and the STA device.

For example, in case that the third indication information indicates that the STA device requests the EDCA parameter set, the second request frame from the first AP device includes a first EDCA parameter, and the first EDCA parameter set may be an EDCA parameter set used by the NSEP priority access service between the first AP device and the STA device.

For another example, in case that the third indication information indicates that the STA device requests the EDCA parameter set, the second request frame from the first AP device includes the third information to indicate, to the second AP device, that the STA device requests the EDCA parameter set, so that the second AP device can determines, according to the third indication information, a corresponding EDCA parameter set which is used by a subsequent NSEP priority access service between the second AP device and the STA device.

Optionally, in some embodiments, after receiving the NSEP priority access permission of the STA device, the second AP device may perform verification according to the NSEP priority access permission of the STA device to determine the NSEP priority access authority of the STA device.

In some embodiments of the disclosure, the NSEP priority access permission of the STA device includes at least one of:

first information, configured to indicate whether the STA device has an NSEP priority access authority;

second information, configured to indicate whether the STA device has an NSEP priority access authority of a non-MLD identity;

third information, configured to indicate whether the STA device has an NSEP priority access authority of an MLD identity; or fourth information, configured to indicate priority information of NSEP priority access of the STA device.

For example, the second AP device may determine, according to the first information, whether the STA device has the NSEP priority access authority.

For another example, the second AP device may determine, according to the second information, whether the STA device has the NSEP priority access authority of the non-MLD identity.

For yet another example, the second AP device may determine, according to the third information, whether the STA device has the NSEP priority access authority of the MLD identity.

For still another example, the second AP device may determine, according to the fourth information, the priority of NSEP priority access of the STA device. Further, it can be determined according to the priority that a corresponding EDCA parameter is ensured to have the priority of the STA device.

In some embodiments of the disclosure, the method 200 further includes the following operations.

The first AP device receives a second response frame sent by the second AP device, and the second response frame includes a target status code which is configured to indicate a transfer result of the NSEP priority access permission of the STA device.

In some embodiments, the target status code is one of:

a first status code (denoted by SUCCESS), configured to indicate that the NESP priority access permission of the STA device is successfully transferred, and the STA device has the NSEP priority access authority;

a second status code (denoted by NSEP_DENIED_UN-AUTHORIZED), configured to indicate that the STA device does not have the NSEP priority access authority, for example, the non-AP MLD or the non-AP EHT STA is not authorized to use the NSEP priority access service;

a third status code (denoted by NSEP_DENIE-D_OTHER_REASON), configured to indicate that the STA device is temporarily denied to use the NSEP priority access, for example, the NSEP priority access is denied due to other reasons except the standard; or a fourth status code (denoted by NSEP_DELAYED_AU-THORIZATION), configured to indicate that the STA device needs to delay a request for the NSEP priority access, for example, in case that a number of STAs for the NSEP priority access service at present in the whole world is too many, the AP may reply with this status code.

Optionally, in case that the target status code is the first status code, the STA device determines to initiate the request for the NSEP priority access to the second AP device, for example, the STA device may send an NSEP Priority Access Enable Request frame to the second AP device to request enabling the NSEP priority access.

In some embodiments, in case that the target status code is the second status code, the STA device determines not to initiate the request for the NSEP priority access to the second AP device, that is, the STA device does not send the NSEP Priority Access Enable Request frame to the second AP device.

Optionally, in case that the target status code is the third status code, the STA device determines to initiate the request for the NSEP priority access to the second AP device. For example, the NSEP Priority Access Enable Request frame may be sent to the second AP device to request enabling the NSEP priority access.

Optionally, in case that the target status code is the fourth status code, the STA device determines to initiate the request for the NSEP priority access to the second AP device. For example, the STA device may send the NSEP Priority Access Enable Request frame to the second AP device to request enabling the NSEP priority access.

In some embodiments of the disclosure, the second response frame may further include at least fourth indication information or a second EDCA parameter set, and the fourth indication information is configured to indicate whether the second AP device accepts an EDCA parameter set suggested by the first AP device.

For example, in response to that the second AP device accepts the EDCA parameter set (i.e., the first EDCA parameter set) suggested by the first AP device, the second response frame may include only the fourth indication information that is configured to indicate that the second AP device accepts the EDCA parameter set suggested by the first AP device.

For another example, in response to that the second AP device does not accept part or all of the EDCA parameter sets suggested by the first AP device, the second response frame may include the second EDCA parameter set that is configured to indicate an EDCA parameter set expected by the second AP device.

In some embodiments of the disclosure, the method 200 further includes the following operations.

The first AP device sends a first response frame to the STA device, and the first response frame includes at least a target status code or a target EDCA parameter set. The target status code is configured to indicate a transfer result of the NSEP priority access permission of the STA device.

In some embodiments, the target status code is determined according to the target status code in the second response frame. That is, the first AP device may feedback the target status code replied by the second AP device to the STA device.

In some embodiments, the target EDCA parameter set is determined according to the fourth indication information and/or the second EDCA parameter set in the second response frame.

For example, in response to that the fourth indication information is configured to indicate that the second AP device accepts the EDCA parameter set suggested by the first AP device, the target EDCA parameter set is the first EDCA parameter set. Alternatively, in response to that the second response frame includes the second EDCA parameter set, the target EDCA parameter set may be the second EDCA parameter set.

Further, after receiving the first response frame, the STA device may determine subsequent operations according to the target status code in the first response frame. For example, the STA device initiates a reassociation request to the second AP device in case that the target status code is the first status code, or the STA device does not initiate the NSEP priority access to the second AP device in case that the target status code is the second status code.

In some scenarios, in response to that a status code obtained when the STA device and the first AP device perform the NSEP priority access is NSEP_DENIE-D_OTHER_REASON or NSEP_DENIED_UNAUTHOR-IZED, the second AP device may also deny the NSEP priority access of the STA device based on the same NSEP priority access permission. In the embodiments of the disclosure, the second AP device may verify the NSEP priority access permission of the STA device according to the NSEP priority access permission of the STA device at an FT stage. In this way, the second AP device may inform the STA device in advance of whether the NSEP priority access is denied, so that the terminal device may no longer initiate the NSEP priority access in case that the NESP priority access is denied.

In some embodiments, the STA device may perform subsequent operations according to types of to-be-executed services.

For example, for the terminal device performing FT to perform the NSEP priority access service only, in response to that the STA device no longer performs the reassociation with the second AP device at a reassociation stage, it is not necessary to send the NSEP Priority Access Enable Request frame to request enabling the NSEP priority access, thereby saving signaling overhead.

For another example, for the STA device performing the FT to perform the NSEP service and other services, the STA device may still perform the reassociation with the second AP device. However, after the reassociation, it is not necessary to send the NSEP Priority Access Enable Request frame to the second AP device to request enabling the NSEP priority access, thereby saving overhead.

A method for wireless communication according to an embodiment of the disclosure is described below with reference to FIG. 5, FIG. 6 and FIG. 7, by taking interactions among an STA, a current AP and a target AP as an example.

Figure 5:
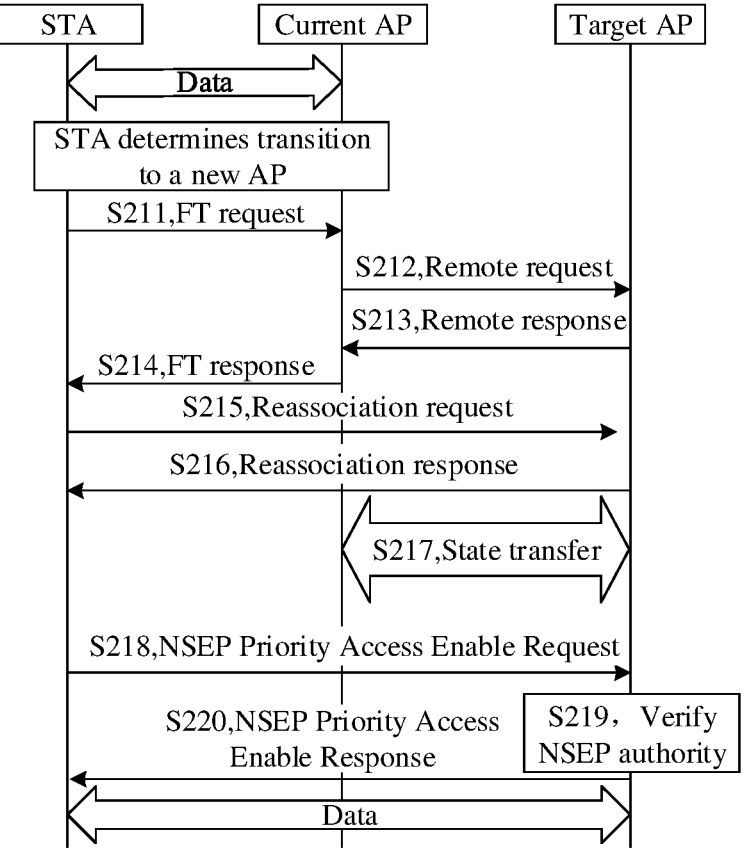
FIG. 5 to FIG. 7 are interaction diagrams of some other methods for wireless communication according to embodiments of the disclosure.

FIG. 5 is an interaction diagram of a method for wireless communication according to an embodiment of the disclosure, and is denoted by a first embodiment. As shown in FIG. 5, the method may include the following operations.

Firstly, a STA (i.e., FTO) performs AP transition using an FT mechanism and is successfully reassociated with a target AP.

Specifically, the method may include the following operations.

At S211, the STA sends an FT request frame to a current AP, and the FT request frame includes a MAC address of the target AP.

At S212, the current AP sends a remote request frame to the target AP.

At S213, the target AP sends a remote response frame to the current AP, and the remote response frame includes a status code configured to indicate whether FT of the target AP is successful.

At S214, the current AP sends an FT response frame to the STA, and the FT response frame includes a status code replied by the target AP.

Further, in case that the FT transition is successful, at S215, the STA sends a reassociation request frame to the target AP.

At S216, the target AP sends a reassociation response frame to the STA.

Further, at S217, the current AP transfers dot11NonAPStationAuthNSEPPriorityAccesstype of the STA to the target AP through state transfer of an interworking procedure.

Optionally, at S217, the current AP may also transfer other information in dot11InterworkingEntry of the STA except the dot11NonAPStationAuthNSEPPriorityAccesstype of the STA to the target AP through the state transfer of the interworking procedure.

Further, at S218, the STA requests the target AP to enable NSEP priority access by sending an NSEP Priority Access Enable Request frame.

At S219, the target AP verifies an NSEP priority access permission authority of the STA according to the dot11NonAPStationAuthNSEPPriorityAccesstype of the STA.

At S220, the target AP sends an NSEP Priority Access Enable Response frame to the STA. The NSEP Priority Access Enable Response frame includes a status code configured to indicate whether the NSEP priority access is successfully enabled, and the NSEP Priority Access Enable Response frame may further include EDCA parameters for the STA to set state variables such as CWmin[AC], CWmax[AC], AIFSN[AC], TXOP_Limit[AC], etc.

In some scenarios, it may be considered that the state transfer belongs to an reassociation process, that is, the state transfer is part of the reassociation process. The reassociation process may include a reassociation request frame, a reassociation response frame and a state transfer operation, and the state transfer is performed after the reassociation response frame.

In some other scenarios, it may be considered that the state transfer and the reassociation process are separate operations, and the state transfer is performed after the reassociation response frame in the reassociation process.

In summary, in the first embodiment, the FT transition is performed first, and then the NSEP priority access permission of the STA is transmitted.

Figure 6:
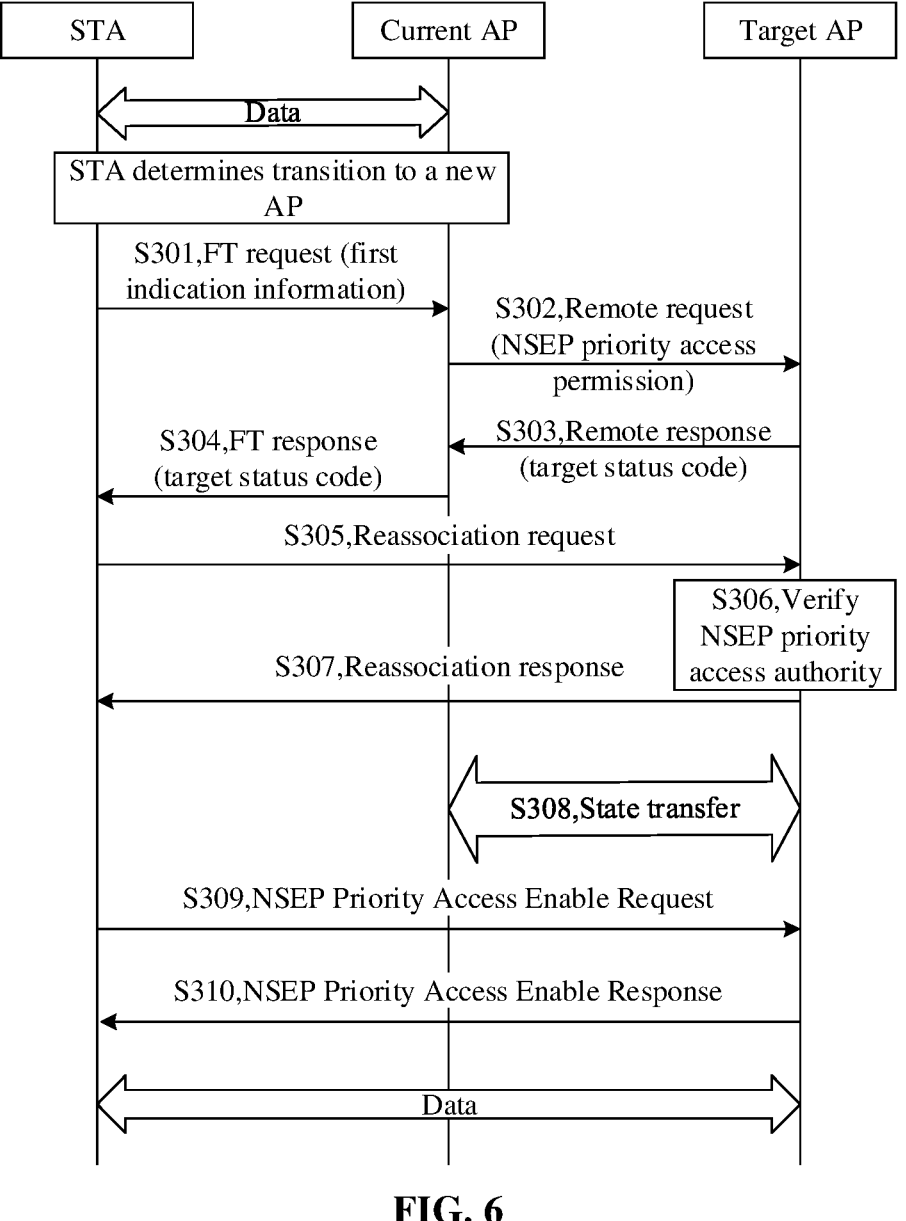

FIG. 6 is an interaction diagram of another method for wireless communication according to an embodiment of the disclosure, and is denoted by a second embodiment. As shown in FIG. 6, the method may include the following operations.

At S301, a STA sends an FT request frame to a current AP.

The FT request frame includes first indication information, and the first indication information is configured to indicate that the STA requests the current AP to transfer NSEP priority access permission of the STA to a target AP.

Optionally, in some embodiments, in response to that a status code obtained when the STA and the current AP perform NSEP priority access is NSEP_DENIED_UNAU-THORIZED, it indicates that the STA does not have an NESP priority access authority, and in this case, the FT request frame may not include the first indication information, or the first indication information is configured to indicate that the STA does not request the current AP to transfer the NSEP priority access permission of the STA to the target AP.

At S302, the current AP sends a remote request frame to the target AP.

The remote request frame includes the NSEP priority access permission of the STA.

Optionally, in some embodiments, the remote request frame may also include dot11InterworkingEntry of the STA.

That is, the current AP may transfer only the NSEP priority access permission through the remote request frame, or may transfer the dot11InterworkingEntry.

At S303, the target AP sends a remote response frame to the current AP, the remote response frame includes a target status code configured to indicate a transfer result of the NSEP priority access permission of the STA.

At S304, the current AP sends an FT response frame to the STA, and the FT response frame includes a target status code replied by the target AP.

In some scenarios, in response to that a status code obtained when the STA and the current AP perform NSEP priority access is NSEP_DENIED_OTHER_REASON or NSEP_DENIED_UNAUTHORIZED, the target AP may also deny the NSEP priority access of the STA based on the same NSEP priority access permission. In the embodiment, the target AP may verify the NSEP priority access permission of the STA according to the NSEP priority access permission of the STA at an FT transition stage. In this way, the target AP device may inform the STA in advance of whether the NSEP priority access is denied, so that the STA may no longer initiate the NSEP priority access in case that the NESP priority access is denied.

Further, at S305, the STA sends a reassociation request frame to the target AP.

At S306, the target AP verifies the NSEP priority access permission of the STA according to the NSEP priority access permission of the STA.

At S307, the target AP sends a reassociation response frame to the STA.

Optionally, in the case that the current AP transfers only the NSEP priority access permission of the STA to the target AP at S302, the current AP may transfer other information in dot11InterworkingEntry of the STA except the NSEP priority access permission of the STA to the target AP through state transfer of an interworking procedure at S308.

Alternatively, in response to that the dot11InterworkingEntry of the STA is transferred at S302, S308 may not be performed.

Further, at S308, the STA requests the target AP to enable the NSEP priority access by sending an NSEP Priority Access Enable Request frame.

At S309, the target AP verifies an NSEP priority access permission authority of the STA according to the NSEP priority access permission of the STA.

At S310, the target AP sends an NSEP Priority Access Enable Response frame to the STA. The NSEP Priority Access Enable Response frame includes a status code configured to indicate whether the NSEP priority access is successfully enabled, and the NSEP Priority Access Enable Response frame may further include an EDCA parameter for the STA to set state variables such as CWmin[AC], CWmax[AC], AIFSN[AC], TXOP_Limit[AC], etc.

In summary, in the second embodiment, the NSEP priority access permission of the STA is transmitted while the FT is performed.

Figure 7:
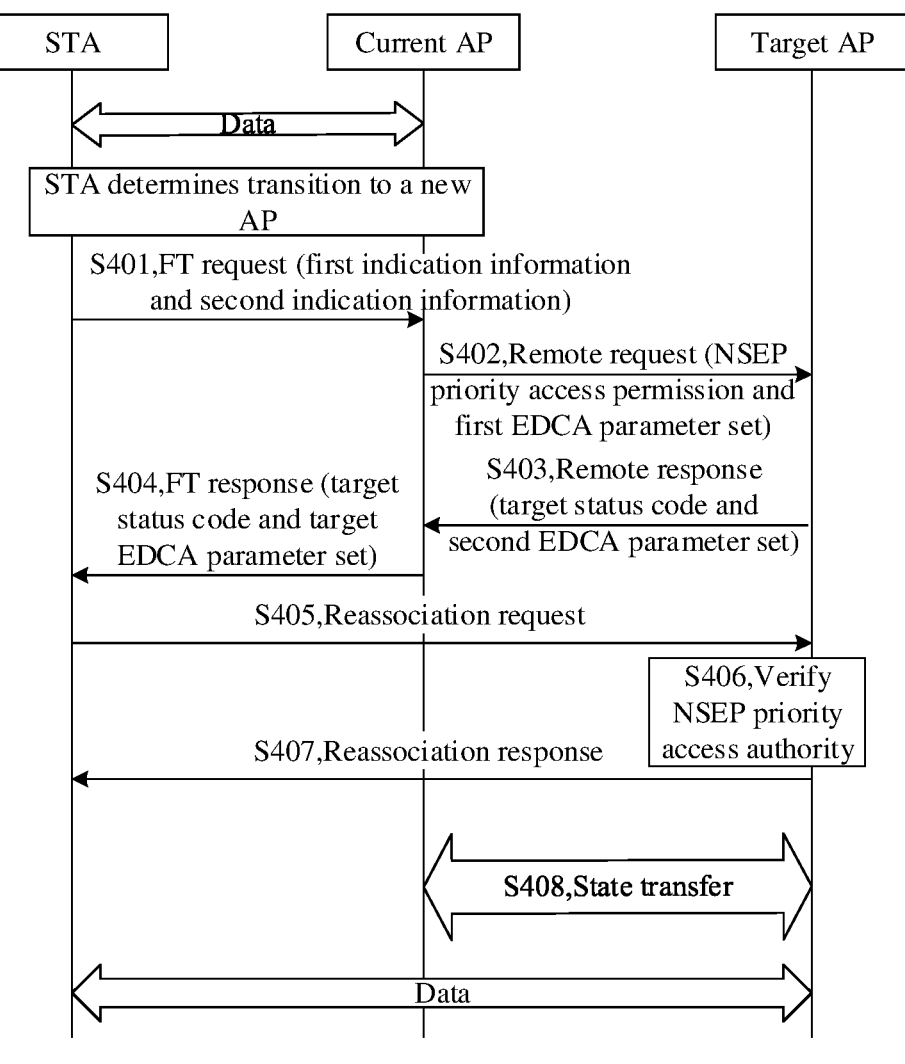

FIG. 7 is an interaction diagram of yet another method for wireless communication according to an embodiment of the disclosure, and is denoted by a third embodiment. As shown in FIG. 7, the method may include the following operations.

At S401, a STA sends an FT request frame to a current AP.

The FT request frame includes first indication information and second indication information. The first indication information is configured to indicate that the STA requests the current AP to transfer NSEP priority access permission of the STA to a target AP, and the second indication information is configured to indicate the STA to request an EDCA parameter set.

Optionally, in some embodiments, in response to that a status code obtained when the STA and the current AP perform NSEP priority access is NSEP_DENIED_UNAUTHORIZED, it indicates that the STA does not have an NESP priority access authority, and in this case, the FT request frame may not include the first indication information. Alternatively, the first indication information is configured to indicate that the STA does not request the current AP to transfer the NSEP priority access permission of the STA to the target AP.

At S402, the current AP sends a remote request frame to the target AP.

In some embodiments, the remote request frame includes the NSEP priority access permission of the STA.

In some embodiments, the remote request frame includes a first EDCA parameter set or third indication information, and the third indication information is configured to indicate that the STA requests for acquiring an EDCA parameter set.

Optionally, in some embodiments, the remote request frame may also include dot11InterworkingEntry of the STA.

At S403, the target AP sends a remote response frame to the current AP.

The remote response frame includes a target status code configured to indicate a transfer result of the NSEP priority access permission of the STA.

In some embodiments, the remote response frame may further include fourth indication information or a second EDCA parameter set, and the fourth indication information is configured to indicate that the target AP accepts a first EDCA parameter set suggested by the current AP, and the second EDCA parameter set is configured to indicate an EDCA parameter set expected by the target AP.

At S404, the current AP sends an FT response frame to the STA.

The FT response frame includes a target status code and a target EDCA parameter set replied by the target AP.

The target EDCA parameter set may be the first EDCA parameter set, or may be the second EDCA parameter set.

Further, at S405, the STA sends a reassociation request frame to the target AP.

At S406, the target AP verifies the NSEP priority access permission of the STA according to the NSEP priority access permission of the STA.

At S407, the target AP sends a reassociation response frame to the STA.

Optionally, in response to that the current AP transfers only the NSEP priority access permission of the STA to the target AP at S402, the current AP may transfer other information in dot11InterworkingEntry of the STA except the NSEP priority access permission of the STA to the target AP through state transfer of an interworking procedure at S408.

Further, the STA and the target A may directly enable NSEP priority access service based on the target EDCA parameter set, thereby reducing delay of the NSEP priority access service.

In summary, in the third embodiment, the NSEP priority access permission of the STA and the EDCA parameter set may be transmitted while the FT is performed.

Frame formats of frames related to embodiments of the disclosure are described below with reference to FIG. 8 to FIG. 23.

Firstly, a frame format of a first request frame according to an embodiment of the disclosure is described with reference to FIG. 8 to FIG. 11.

In some embodiments, the first request frame includes an NSEP priority access permission transfer request element which is configured to carry the first indication information.

For example, the first indication information is carried in a manner where the NSEP priority access permission transfer request element is newly added to the first request frame. Alternatively, a reserved bit of the first request frame may be re-defined as the NSEP priority access permission transfer request element to carry the first indication information.

Figure 8:
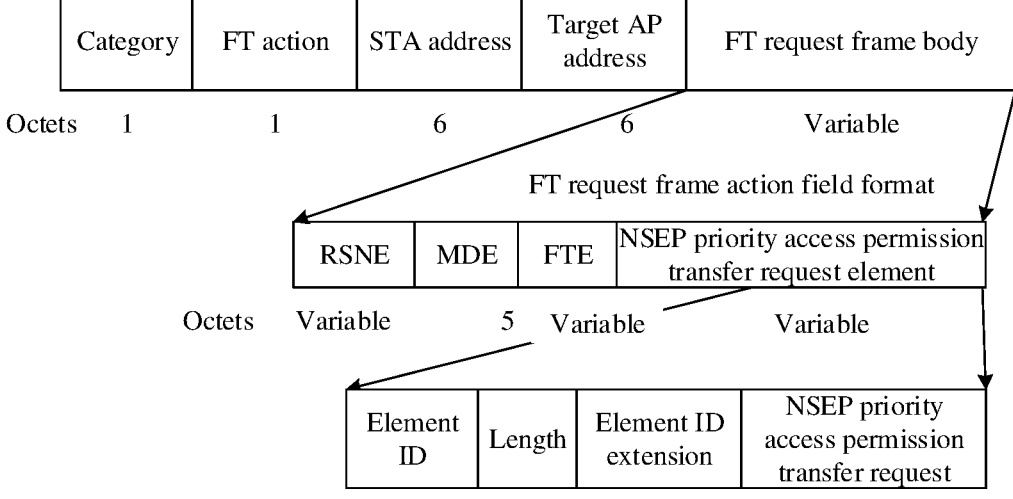
FIG. 8 to FIG. 11 are format diagrams of an FT request frame according to an embodiment of the disclosure.

In some embodiments, the first request frame is an FT request frame, and FIG. 8 is a format diagram of the FT request frame carrying the NSEP priority access permission transfer request element. As shown in FIG. 8, the NSEP priority access permission transfer request element may be included in an FT request frame body of the FT request frame. For example, the NSEP priority access permission transfer request element may be added after a Fast basic service set Transition Element (FTE) of the FT request frame body to carry the first indication information.

As shown in FIG. 8, the FT request frame body may further include the following elements:

Robust Security Network element (RSNE); and

Mobility Domain element (MDE).

It should be understood that in the embodiment of the disclosure, a number of bytes occupied by the NSEP priority access permission transfer request element may be determined according to a length of the first indication information to be carried by this element, which is not limited in the disclosure.

Optionally, as shown in FIG. 8, the NSEP priority access permission transfer request element may include the following fields:

Element Identifier (ID);

Length;

Element ID extension; and

NSEP Priority Access Permission Transfer Request.

In some other embodiments, the first request frame includes an NSEP priority access permission transfer request field which is configured to carry the first indication information.

For example, the first indication information is carried in a manner where the NSEP priority access permission transfer request field is newly added to the first request frame. Alternatively, a reserved bit of the first request frame may be re-defined as the NSEP priority access permission transfer request field to carry the first indication information.

Figure 9:
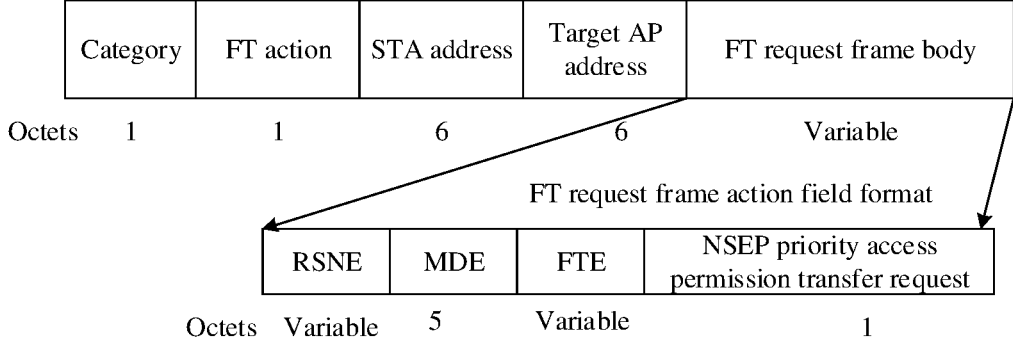

In some embodiments, the first request frame is an FT request frame, and FIG. 9 is a format diagram of the FT request frame carrying the NSEP priority access permission transfer request field. As shown in FIG. 9, the NSEP priority access permission transfer request field is included in an FT request frame body of the FT request frame. For example, the NSEP priority access permission transfer request field may be added after an FTE of the FT request frame body, to carry the first indication information.

It should be understood that in the embodiment of the disclosure, a number of bytes occupied by the NSEP priority access permission transfer request field may be determined according to a length of the first indication information to be carried by this field, which is not limited in the disclosure.

Frame formats of the FT request frames shown in FIG. 8 and FIG. 9 may be applicable to the foregoing second embodiment.

In some embodiments, the first request frame includes an EDCA parameter set request element which is configured to carry the second indication information.

For example, the second indication information is carried in a manner where the EDCA parameter set request element is newly added to the first request frame. Alternatively, a reserved bit of the first request frame may be re-defined as the EDCA parameter set request element to carry the second indication information.

As an example, the first request frame is an FT request frame, and the EDCA parameter set request element may be included in an FT request frame body of the FT request frame to carry the second indication information.

In some other embodiments, the first request frame includes an EDCA parameter set request field which is configured to carry the second indication information.

For example, the second indication information is carried in a manner where the EDCA parameter set request field is newly added to the first request frame. Alternatively, a reserved bit of the first request frame may be re-defined as the EDCA parameter set request field to carry the second indication information.

As an example, the first request frame is an FT request frame, and the EDCA parameter set request field may be included in an FT request frame body of the FT request frame to carry the second indication information.

Figure 10:
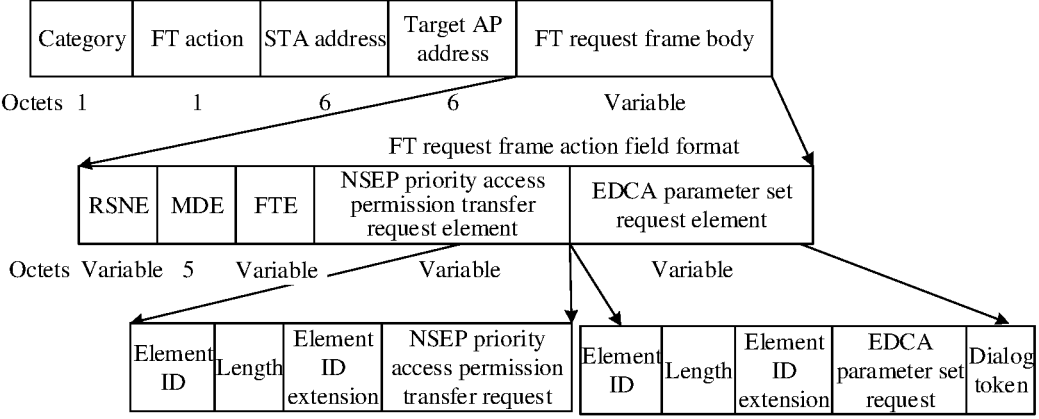

FIG. 10 is a format diagram of an FT request frame carrying an NSEP priority access permission transfer request element and an EDCA parameter set request element. As shown in FIG. 10, the NSEP priority access permission transfer request element and the EDCA parameter set request element may be included in an FT request frame body of the FT request frame. For example, the NSEP priority access permission transfer request element and the EDCA parameter set request element may be added after an FTE of the FT request frame body to carry a first indication information and a second indication information respectively.

It should be understood that a number of bytes occupied by the NSEP priority access permission transfer request element may be determined according to a length of the first indication information to be carried, and a number of bytes occupied by the EDCA parameter set request element may be determined according to a length of the second indication information to be carried, which are not limited in the disclosure.

Optionally, as shown in FIG. 10, the NSEP priority access permission transfer request element may include the following fields:

Element ID;

Length;

Element ID extension; and

NSEP Priority Access Permission Transfer Request.

Optionally, as shown in FIG. 10, the EDCA parameter set request element may include the following fields:

Element ID;

Length;

Element ID extension;

EDCA parameter set request; and

Dialog token.

Figure 11:
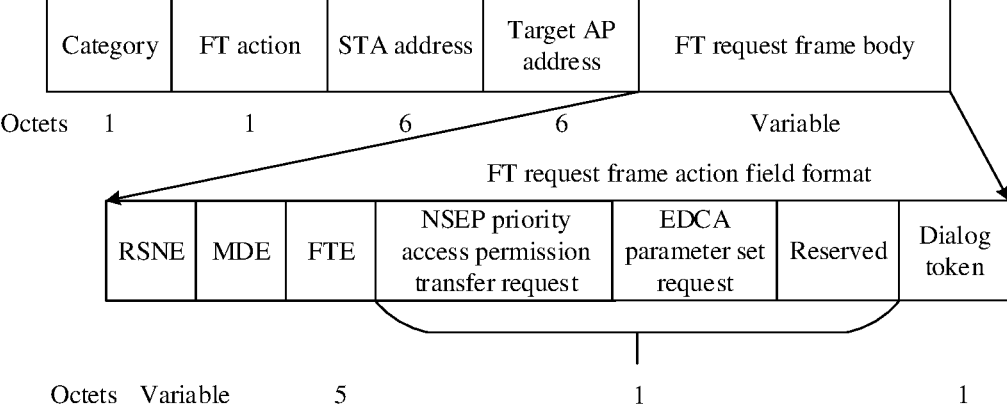

FIG. 11 is a format diagram of an FT request frame carrying an NSEP priority access permission transfer request field and an EDCA parameter set request field. As shown in FIG. 11, the NSEP priority access permission transfer request field and the EDCA parameter set request field may be included in an FT request frame body of the FT request frame. For example, the NSEP priority access permission transfer request field and the EDCA parameter set request field may be added after an FTE of the FT request frame body to carry a first indication information and a second indication information respectively.

It should be understood that a length occupied by the NSEP priority access permission transfer request field may be determined according to a length of the first indication information to be carried, and a length occupied by the EDCA parameter set request field may be determined according to a length of the second indication information to be carried. A length shown in FIG. 11 is merely an example, and the disclosure is not limited thereto.

As shown in FIG. 11, the FT request frame body further includes the following fields: FTE, RSNE, MDE, reservation, and dialog token.

Frame formats of the FT request frames shown in FIG. 10 and FIG. 11 may be applicable to the foregoing third embodiment.

A frame format of a second request frame according to an embodiment of the disclosure is described below with reference to FIG. 12 to FIG. 15.

In some embodiments, the second request frame includes an NSEP priority access permission element which is configured to carry the NSEP priority access permission of the STA device.

For example, the NSEP priority access permission of the STA device is carried in a manner where the NSEP priority access permission element is newly added to the second request frame. Alternatively, a reserved bit of the second request frame may be re-defined as the NSEP priority access permission element to carry the NSEP priority access permission of the STA device.

In some embodiments, the second request frame is a remote request frame, and FIG. 12 is a format diagram of the remote request frame carrying the NSEP priority access permission element.

As an example, as shown in FIG. 12, the NSEP priority access permission element may be included in an FT request frame body of an FT action frame in the remote request frame (the FT action frame is the FT request frame when in the remote request frame). For example, the NSEP priority access permission element may be added after an FTE of the FT request frame body to carry the NSEP priority access permission of the STA device.

It should be understood that a number of bytes occupied by the NSEP priority access permission element may be determined according to a maximum length of the NSEP priority access permission of the STA device to be carried, which is not limited in the disclosure.

Optionally, as shown in FIG. 12, the NSEP priority access permission element may include the following fields:

Element ID;

Length;

Element ID extension;

NSEP Priority Access Permission length; and

NSEP Priority Access Permission.

In some other embodiments, the second request frame includes an NSEP priority access permission field which is configured to carry the NSEP priority access permission of the STA device.

For example, the NSEP priority access permission of the STA device is carried in a manner where the NSEP priority access permission field is newly added to the second request frame. Alternatively, a reserved bit of the second request frame may be re-defined as the NSEP priority access permission field to carry the NSEP priority access permission of the STA device.

Figure 13:
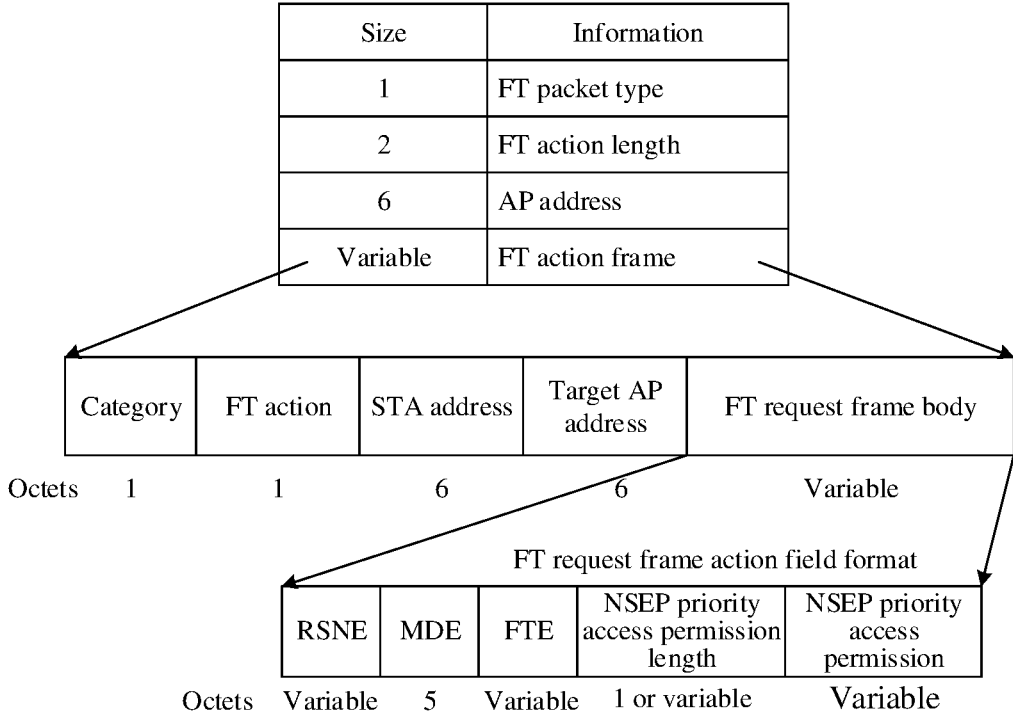

In some embodiments, the second request frame is a remote request frame, and FIG. 13 is a format diagram of the remote request frame carrying the NSEP priority access permission field. As shown in FIG. 13, the NSEP priority access permission field may be included in an FT request frame body of an FT action frame in the remote request frame (the FT action frame is the FT request frame when in the remote request frame). For example, the NSEP priority access permission field may be added after an FTE of the FT request frame body to carry the NSEP priority access permission of the STA device.

It should be understood that a number of bytes occupied by the NSEP priority access permission field may be determined according to a maximum length of the NSEP priority access permission of the STA device to be carried, which is not limited in the disclosure.

Optionally, as shown in FIG. 13, the remote request frame may further include an NSEP priority access permission length field which is configured to indicate a length of the NSEP priority access permission.

Frame formats of the remote request frames shown in FIG. 12 and FIG. 13 may be applicable to the foregoing second embodiment.

In some embodiments, the second request frame includes an EDCA parameter set request element which is configured to carry the third indication information.

For example, EDCA parameter set request information of the STA device is carried in a manner where the EDCA parameter set request element is newly added to the second request frame. Alternatively, a reserved bit of the second request frame may be re-defined as the EDCA parameter set request element to carry the EDCA parameter set request information of the STA device.

In some other embodiments, the second request frame includes an EDCA parameter set request field which is configured to carry the third indication information.

For example, the EDCA parameter set request information of the STA device is carried in a manner where the EDCA parameter set request field is newly added to the second request frame. Alternatively, a reserved bit of the second request frame may be re-defined as the EDCA parameter set request field to carry the EDCA parameter set request information of the STA device.

As an example, the second request frame is a remote request frame, and the EDCA parameter set request element or the EDCA parameter set request field may be included in an FT request frame body of an FT request frame in the remote request frame.

In some embodiments, the second request frame includes an EDCA parameter set element which is configured to carry the first EDCA parameter set.

For example, the EDCA parameter set of the STA device is carried in a manner where the EDCA parameter set element is newly added to the second request frame. Alternatively, a reserved bit of the second request frame may be re-defined as the EDCA parameter set element to carry the EDCA parameter set of the STA device.

In some other embodiments, the second request frame includes an EDCA parameter set field which is configured to carry the first EDCA parameter set. For example, the EDCA parameter set of the STA device is carried in a manner where the EDCA parameter set field is newly added to the second request frame. Alternatively, a reserved bit of the second request frame may be re-defined as the EDCA parameter set field to carry the EDCA parameter set of the STA device.

As an example, the second request frame is a remote request frame, and the EDCA parameter set element or the EDCA parameter set field may be included in an FT request frame body of an FT request frame in the remote request frame.

The frame format of the remote request frame is described by an example where the NSEP priority access permission and the first EDCA parameter set of the STA device are carried by the remote request frame.

Figure 14:
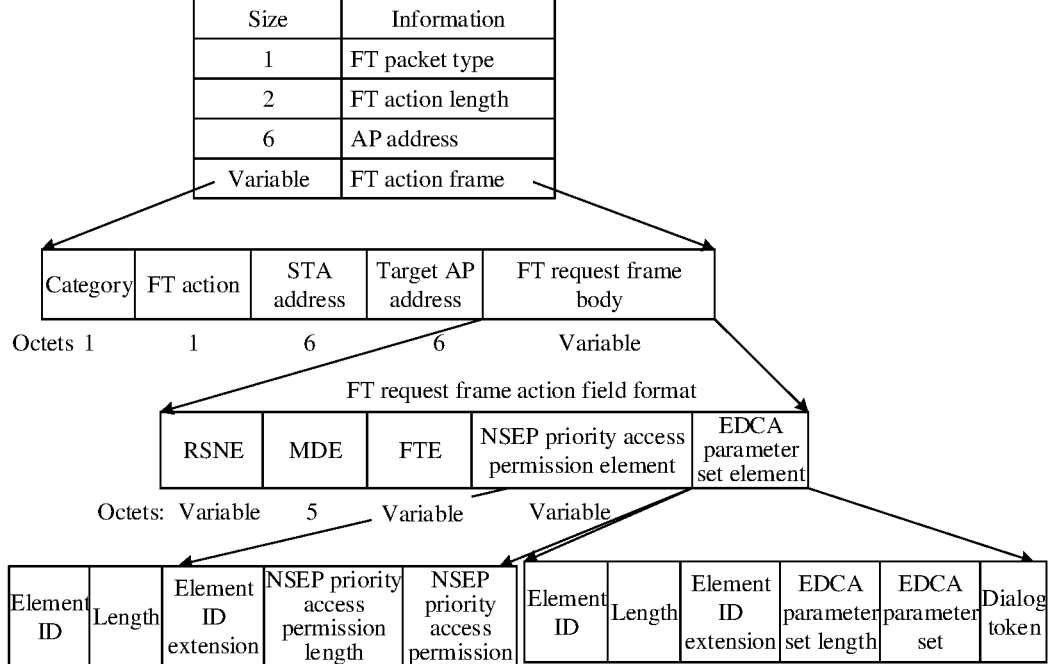

As shown in FIG. 14, the NSEP priority access permission element and the EDCA parameter set element may be included in an FT request frame body of an FT action frame in the remote request frame (the FT action frame is the FT request frame when in the remote request frame). For example, the NSEP priority access permission element and the EDCA parameter set element may be added after an FTE of the FT request frame body to carry the NSEP priority access permission and the first EDCA parameter set of the STA device respectively.

It should be understood that a number of bytes occupied by the NSEP priority access permission element may be determined according to a maximum length of the NSEP priority access permission of the STA device to be carried, and the EDCA parameter set element is determined according to a maximum length of the EDCA parameter set to be carried, which are not limited in the disclosure.

Optionally, as shown in FIG. 14, the NSEP priority access permission element may include the following fields:

Element ID;

Length;

Element ID extension;

NSEP Priority Access Permission length; and

NSEP Priority Access Permission.

Optionally, as shown in FIG. 14, the EDCA parameter set element may include the following fields:

Element ID;

Length;

Element ID extension;

EDCA parameter set length;

EDCA parameter set; and

Dialog token.

As shown in FIG. 15, the NSEP priority access permission field and the EDCA parameter set field may be included in an FT request frame body of an FT action frame in the remote request frame (the FT action frame is the FT request frame when in the remote request frame). For example, the NSEP priority access permission field and the EDCA parameter set field may be added after an FTE of the FT request frame body to carry the NSEP priority access permission and the first EDCA parameter set of the STA device respectively.

It should be understood that a number of bytes occupied by the NSEP priority access permission field may be determined according to a maximum length of the NSEP priority access permission of the STA device to be carried, and the EDCA parameter set field is determined according to a maximum length of the EDCA parameter set to be carried, which are not limited in the disclosure.

As shown in FIG. 15, the FT request frame body of the FT request frame in the remote request frame may include the following fields:

RSNE, MDE, FTE, NSEP Priority Access Permission length, NSEP Priority Access Permission, dialog token, and EDCA parameter set.

Frame formats of the remote request frames shown in FIG. 14 and FIG. 15 may be applicable to the foregoing third embodiment.

A frame format of a second response frame according to an embodiment of the disclosure is described below with reference to FIG. 16 to FIG. 19.

In some embodiments, the second response frame includes an NSEP priority access permission response element which is configured to carry the target status code.

For example, target status code is carried in a manner where the NSEP priority access permission response element is newly added to the second response frame. Alternatively, a reserved bit of the second response frame may be re-defined as the NSEP priority access permission response element to carry the target status code.

Figure 16:
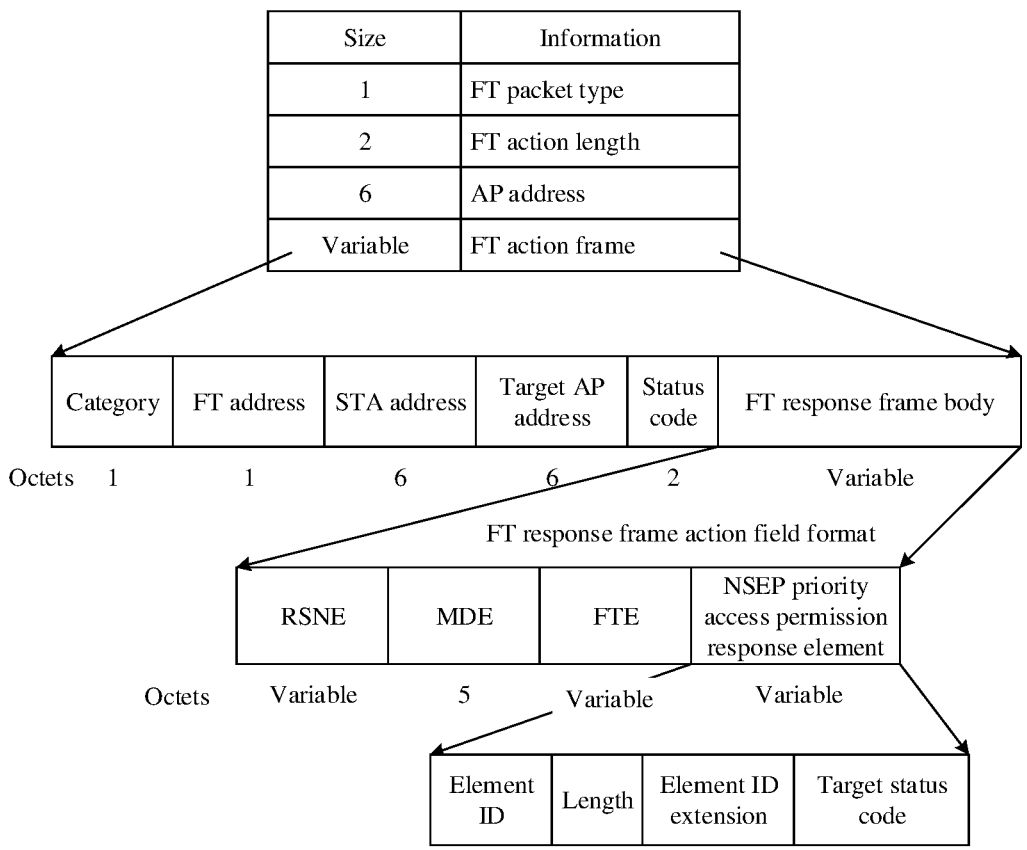
FIG. 16 to FIG. 19 are format diagrams of a remote response frame according to an embodiment of the disclosure.

In some embodiments, the second response frame is a remote response frame, and FIG. 16 is a format diagram of the remote response frame carrying the NSEP priority access permission response element. As shown in FIG. 16, the NSEP priority access permission response element may be included in an FT response frame body of an FT action frame in the remote response frame (the FT action frame is the FT response frame when in the remote response frame). For example, the NSEP priority access permission response element may be added after an FTE of the FT response frame body to carry the target status code.

It should be understood that a number of bytes occupied by the NSEP priority access permission response element may be determined according to a maximum length of the target status code to be carried, which is not limited in the disclosure.

Optionally, as shown in FIG. 16, the NSEP priority access permission response element may include the following fields:

Element ID;

Length;

Element ID extension; and

NSEP Priority Access Permission Response information (i.e., the target status code).

In some other embodiments, the second response frame includes an NSEP priority access permission response field which is configured to carry the target status code.

For example, target status code is carried in a manner where the NSEP priority access permission response field is newly added to the second response frame. Alternatively, a reserved bit of the second response frame may be re-defined as the NSEP priority access permission response field to carry the target status code.

For example, target status code is carried in a manner where the NSEP priority access permission response field is newly added to the second response frame. Alternatively, a reserved bit of the second response frame may be re-defined as the NSEP priority access permission response field to carry the target status code.

Figure 17:
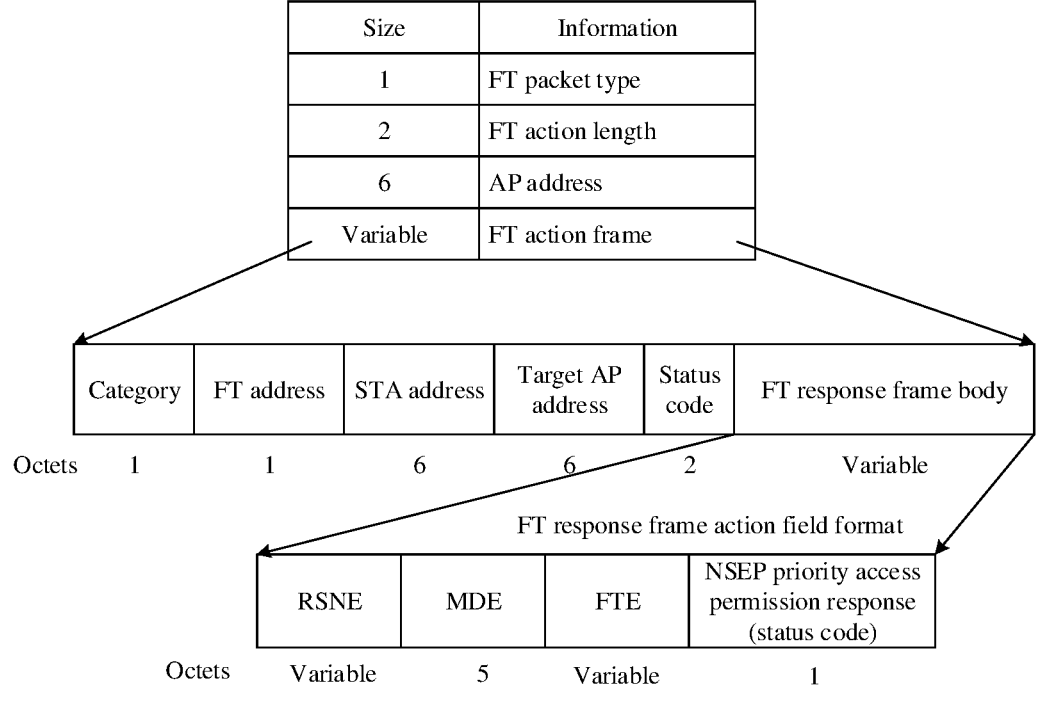

In some embodiments, the second response frame is a remote response frame, and FIG. 17 is a format diagram of the remote response frame carrying the NSEP priority access permission response field. As shown in FIG. 17, the NSEP priority access permission response field may be included in an FT response frame body of an FT action frame in the remote response frame (the FT action frame is the FT response frame when in the remote response frame). For example, the NSEP priority access permission response field may be added after an FTE of the FT response frame body to carry the target status code.

It should be understood that a number of bytes occupied by the NSEP priority access permission response field may be determined according to a maximum length of the target status code to be carried, which is not limited in the disclosure.

Frame formats of the remote response frames shown in FIG. 16 and FIG. 17 may be applicable to the foregoing second embodiment.

In some embodiments, the second response frame includes an EDCA parameter set response element which is configured to carry the fourth indication information, and the fourth indication information is configured to indicate whether the second AP accepts an EDCA parameter set suggested by the first AP device.

For example, the fourth indication information is carried in a manner where the EDCA parameter set response element is newly added to the second response frame. Alternatively, a reserved bit of the second response frame may be re-defined as the EDCA parameter set response element to carry the fourth indication information.

In some other embodiments, the second response frame includes an EDCA parameter set response field which is configured to carry the fourth indication information.

For example, the fourth indication information is carried in a manner where the EDCA parameter set response field is newly added to the second response frame. Alternatively, a reserved bit of the second response frame may be re-defined as the EDCA parameter set response field to carry the fourth indication information.

As an example, the second response frame is a remote response frame, and the EDCA parameter set response element or the EDCA parameter set response field may be included in an FT response frame body of an FT response frame in the remote response frame.

In some embodiments, the second response frame includes an EDCA parameter set element which is configured to carry the second EDCA parameter set, and the second EDCA parameter set is configured to indicate an EDCA parameter set expected by the second AP device.

For example, the second EDCA parameter set is carried in a manner where the EDCA parameter set element is newly added to the second response frame. Alternatively, a reserved bit of the second response frame may be re-defined as the EDCA parameter element to carry the second EDCA parameter set.

In some other embodiments, the second response frame includes an EDCA parameter set field which is configured to carry the second EDCA parameter set.

For example, the second EDCA parameter set is carried in a manner where the EDCA parameter set field is newly added to the second response frame. Alternatively, a reserved bit of the second response frame may be re-defined as the EDCA parameter field to carry the second EDCA parameter set.

As an example, the second response frame is a remote response frame, and the EDCA parameter set element or the EDCA parameter set field may be included in an FT response frame body of an FT response frame in the remote response frame.

The frame format of the remote response frame is described by an example where the target status code and the second EDCA parameter set are carried by the remote response frame.

Figure 18:
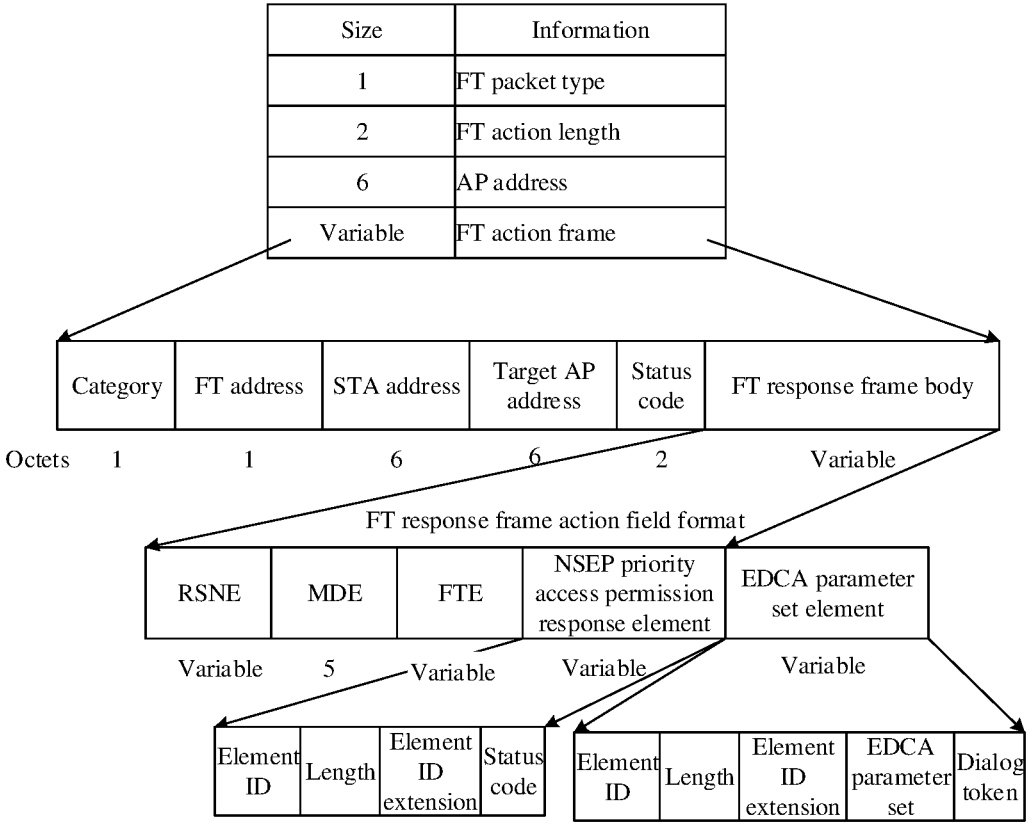

FIG. 18 is a format diagram of the remote response frame carrying the target status code and the EDCA parameter set element. As shown in FIG. 18, the NSEP priority access permission response element and the EDCA parameter set element may be included in an FT response frame body of an FT action frame in the remote response frame (the FT action frame is the FT response frame when in the remote response frame). For example, the NSEP priority access permission response element and the EDCA parameter set element may be added after an FTE of the FT response frame body to carry the target status code and the second EDCA parameter set respectively.

It should be understood that a number of bytes occupied by the NSEP priority access permission response element may be determined according to a maximum length of the target status code to be carried, and a number of bytes occupied by the EDCA parameter set element is determined according to a maximum length of the EDCA parameter set to be carried, which are not limited in the disclosure.

Optionally, as shown in FIG. 18, the NSEP priority access permission response element may include the following fields:

Element ID;
Length;
Element ID extension; and
NSEP Priority access permission response information (i.e., the target status code).

Optionally, as shown in FIG. 18, the EDCA parameter set element may include the following fields:

Element ID;
Length;
Element ID extension;
EDCA parameter set; and
Dialog token.

Figure 19:
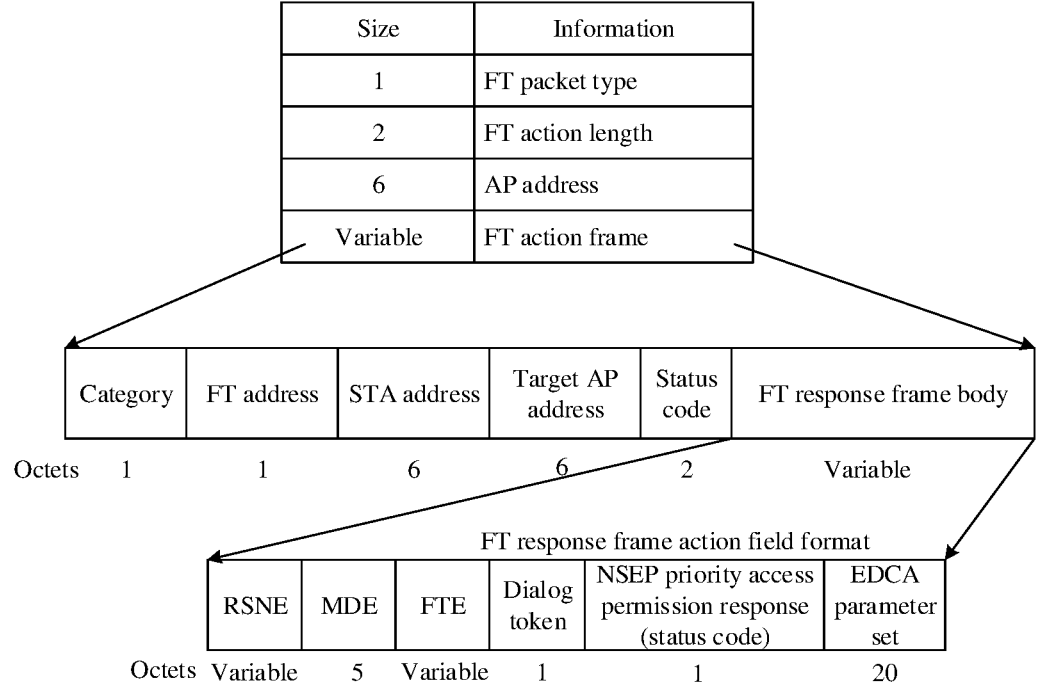

FIG. 19 is a format diagram of the remote response frame carrying the target status code and the EDCA parameter set response field. As shown in FIG. 19, the NSEP priority access permission response field and the EDCA parameter set field may be included in an FT response frame body of an FT action frame in the remote response frame (the FT action frame is the FT response frame when in the remote response frame). For example, the NSEP priority access permission response field and the EDCA parameter set field may be added after an FTE of the FT response frame body to carry the target status code and the second EDCA parameter set respectively.

It should be understood that a number of bytes occupied by the NSEP priority access permission response field may be determined according to a maximum length of the target status code to be carried, and a number of bytes occupied by the EDCA parameter set response field is determined according to a maximum length of the second EDCA parameter set to be carried, which are not limited in the disclosure.

Frame formats of the remote response frames shown in FIG. 18 and FIG. 19 may be applicable to the foregoing third embodiment.

A frame format of a first response frame according to an embodiment of the disclosure is described below with reference to FIG. 20 to FIG. 23.

In some embodiments, the first response frame includes an NSEP priority access permission transfer response element which is configured to carry the target status code.

For example, target status code is carried in a manner where the NSEP priority access permission response element is newly added to the first response frame. Alternatively, a reserved bit of the first response frame may be re-defined as the NSEP priority access permission response element to carry the target status code.

Figure 20:
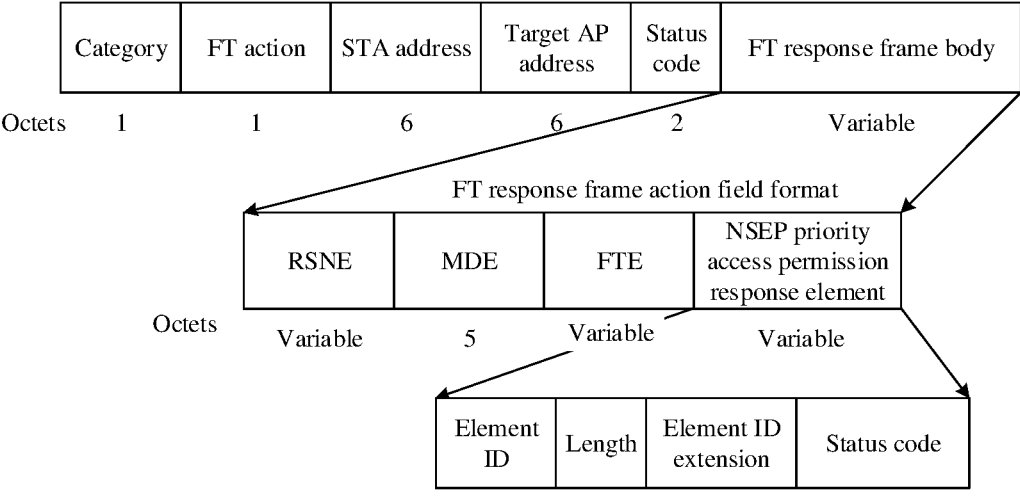
FIG. 20 to FIG. 23 are format diagrams of an FT response frame according to an embodiment of the disclosure.

In some embodiments, the first response frame is an FT response frame, and FIG. 20 is a format diagram of the FT response frame carrying the NSEP priority access permission response element. As shown in FIG. 20, the NSEP priority access permission response element may be included in an FT response frame body of the FT response frame. For example, the NSEP priority access permission response element may be added after an FTE of the FT response frame body to carry the target status code.

It should be understood that a number of bytes occupied by the NSEP priority access permission response element may be determined according to a maximum length of the target status code to be carried, which is not limited in the disclosure.

Optionally, as shown in FIG. 20, the NSEP priority access permission response element may include the following fields:

Element ID;
Length;
Element ID extension; and
NSEP priority access permission response information (i.e., the target status code).

In some other embodiments, the first response frame includes an NSEP priority access permission transfer response field which is configured to carry the target status code.

For example, target status code is carried in a manner where the NSEP priority access permission response field is newly added to the first response frame. Alternatively, a reserved bit of the first response frame may be re-defined as the NSEP priority access permission response field to carry the target status code.

Figure 21:
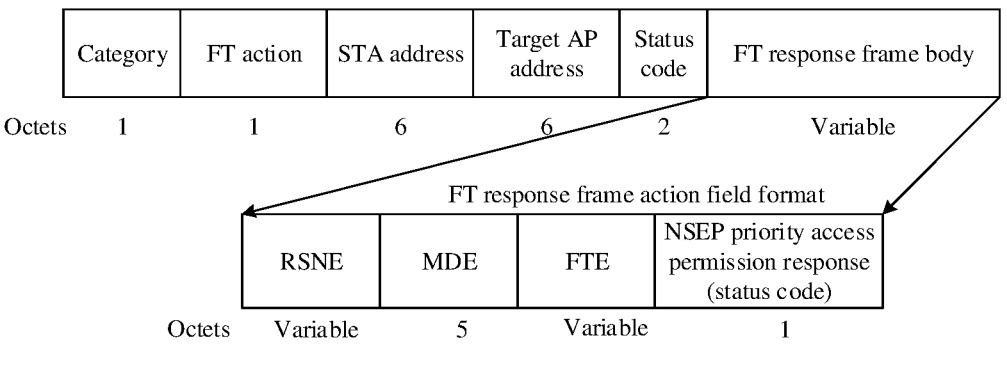

In some embodiments, the first response frame is an FT response frame, and FIG. 21 is a format diagram of the FT response frame carrying the NSEP priority access permission response field. As shown in FIG. 21, the NSEP priority access permission response field may be included in an FT response frame body of the FT response frame. For example, the NSEP priority access permission response field may be added after an FTE of the FT response frame body to carry the target status code.

It should be understood that a number of bytes occupied by the NSEP priority access permission response field may be determined according to a maximum length of the target status code to be carried, which is not limited in the disclosure.

Frame formats of the FT response frames shown in FIG. 20 and FIG. 21 may be applicable to the foregoing second embodiment.

In some embodiments, the first response frame includes an EDCA parameter set element which is configured to carry the target EDCA parameter set.

For example, the target EDCA parameter set is carried in a manner where the EDCA parameter set element is newly added to the first response frame. Alternatively, a reserved bit of the first response frame may be re-defined as the EDCA parameter set element to carry the target EDCA parameter set.

Figure 22:
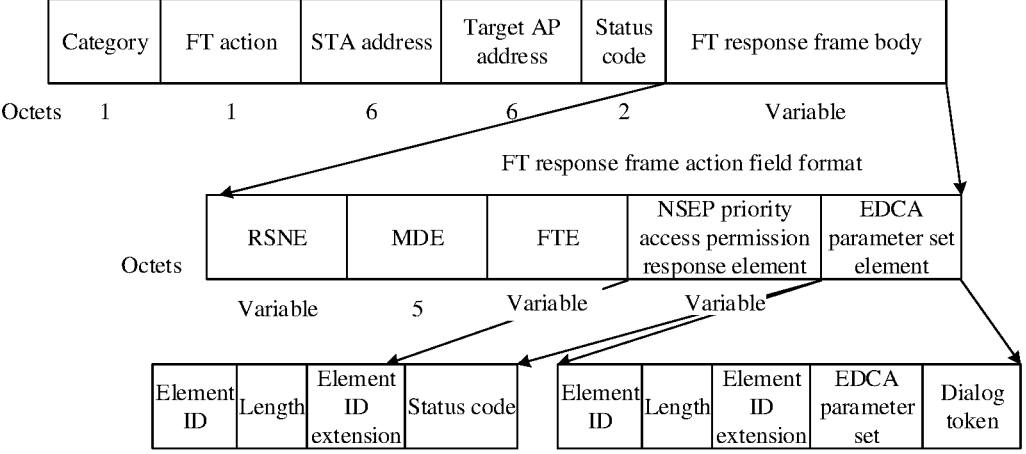

In some embodiments, the first response frame is an FT response frame, and FIG. 22 is a format diagram of the FT response frame carrying the NSEP priority access permission response element and the EDCA parameter set element. As shown in FIG. 22, the NSEP priority access permission response element and the EDCA parameter set element may be included in an FT response frame body of the FT response frame. For example, the NSEP priority access permission response element and the EDCA parameter set element may be added after an FTE of the FT response frame body to carry the target status code and the target EDCA parameter set respectively.

It should be understood that a number of bytes occupied by the NSEP priority access permission response element may be determined according to a maximum length of the target status code to be carried, and a number of bytes occupied by the EDCA parameter set element may be determined according to a maximum length of the target EDCA parameter set to be carried, which are not limited in the disclosure.

Optionally, as shown in FIG. 22, the NSEP priority access permission response element may include the following fields:

Element ID;
Length;
Element ID extension; and
NSEP priority access permission response information (i.e., the target status code).

Optionally, as shown in FIG. 22, the EDCA parameter set element may include the following fields:

Element ID;
Length;
Element ID extension;
EDCA parameter set;
Dialog token.

In some other embodiments, the first response frame includes an EDCA parameter set field which is configured to carry the target EDCA parameter set.

For example, target EDCA parameter set is carried in a manner where the EDCA parameter set field is newly added to the first response frame. Alternatively, a reserved bit of the first response frame may be re-defined as the EDCA parameter set field to carry the target EDCA parameter set.

Figure 23:
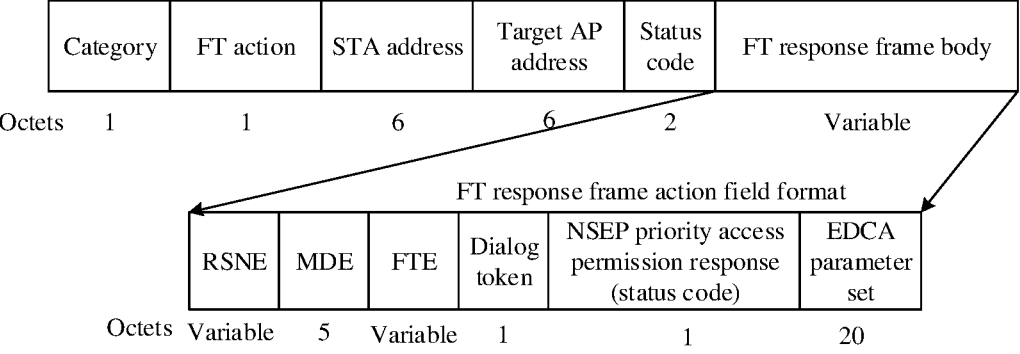

In some embodiments, the first response frame is an FT response frame, and FIG. 23 is a format diagram of the FT response frame carrying the NSEP priority access permission response field and the EDCA parameter set field. As shown in FIG. 23, the NSEP priority access permission response field and the EDCA parameter set field are included in an FT response frame body of the FT response frame. For example, the NSEP priority access permission response field and the EDCA parameter set field may be added after an FTE of the FT response frame body to carry the target status code and the target EDCA parameter set respectively.

It should be understood that a number of bytes occupied by the NSEP priority access permission response field may be determined according to a maximum length of the target status code to be carried, and a number of bytes occupied by the EDCA parameter set field may be determined according to a maximum length of the target EDCA parameter set to be carried, which are not limited in the disclosure.

Frame formats of the FT response frames shown in FIG. 22 and FIG. 23 may be applicable to the foregoing third embodiment.

In summary, the first AP device may transfer the NSEP priority access permission of the STA device to the second AP device in the FT, so that the second AP device may verify the NSEP priority access authority of the STA device in advance, and may inform the STA device in advance of whether the NSEP priority access is denied, which can avoid signaling overhead caused by the STA device subsequently still requesting to enable the NSEP priority access without authority.

Further, in the embodiments of the disclosure, the EDCA parameter set may also be determined in the FT, for example, the first AP device may transmit the EDCA parameter set to the second AP device in the FT, so that after the second AP device being reassociated with the STA device, the determined EDCA parameter set may be directly used to perform the NSEP priority access service, thereby reducing delay of the NSEP priority access service.

Figure 24:
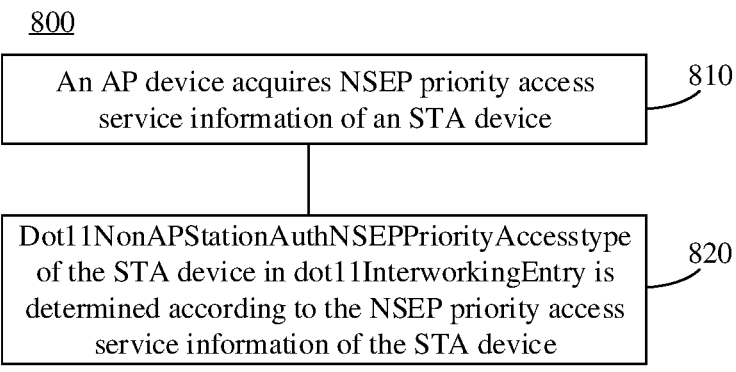
FIG. 24 is an interaction diagram of another method for wireless communication according to an embodiment of the disclosure.

FIG. 24 is a flowchart of another method for wireless communication according to an embodiment of the disclosure. As shown in FIG. 24, the method 800 may include the following operations.

At S810, an AP device acquires NSEP priority access service information of an STA device.

At S820, dot11NonAPStationAuthNSEPPriorityAccesstype of the STA device in dot11InterworkingEntry is determined according to the NSEP priority access service information of the STA device.

In some embodiments, the AP device acquires the NSEP priority access service information of the STA device, which may include the following operations.

The AP device acquires the NSEP priority access service information of the STA device from the SSPN.

In some embodiments, the NSEP priority access service information of the STA device may be configured to indicate services related to NSEP priority access subscribed or unsubscribed by the STA device.

As an example, the NSEP priority access service information of the STA device is configured to indicate at least one of:

whether the STA device has an NSEP priority access authority, identity information of an NSEP priority access service subscribed by the STA device (such as non-MLD, MLD, or non-AP, etc.), or a priority of the NSEP priority access service subscribed by the STA device (which may also be referred to as an NSEP priority access level or an NSEP priority access rank).

In some embodiments of the disclosure, the dot11NonAPStationAuthNSEPPriorityAccesstype includes at least one of:

first information (denoted by Authorized), configured to indicate whether the STA device has an NSEP priority access authority;

second information (denoted by non-MLDNSEPPriority-Access), configured to indicate whether the STA device has an NSEP priority access authority of a non-MLD identity;

third information (denoted by MLDNSEPPriorityAccess), configured to indicate whether the STA device has an NSEP priority access authority of an MLD identity; or fourth information (denoted by NSEPPriorityAccess), configured to indicate priority information of NSEP priority access of the STA device.

In some embodiments, a data type of the first information is one of TruthValue, BOOL, BITS, or INTEGER.

Optionally, in some embodiments, the operation S820 may include the following operations.

A value of the first information is set as a first value in case that it is determined that the STA device has the NSEP priority access authority according to the NSEP priority access service information of the STA device, and the first value is configured to indicate that the STA device has the NSEP priority access authority.

Alternatively, the value of the first information is set as a second value in case that it is determined that the STA device does not have the NSEP priority access authority according to the NSEP priority access service information of the STA device, and the second value is configured to indicate that the STA device does not have the NSEP priority access authority.

Taking the first information having a BOOL type or a TruthValue type as an example, it is assumed that: the value of the first information being TRUE (i.e., 1) indicates that the STA device has the NSEP priority access authority, and the value of the first information being FALSE (i.e., 0) indicates that the STA device does not have the NSEP priority access authority.

In response to that the AP device verifies that the STA device has the NSEP priority access authority, the value of the first information is set as 1, otherwise, the value of the first information is set as 0.

Taking the first information having a BITS type as an example, the first information may include at least one bit; a value of the at least one bit being a first value (such as 1) indicates that the STA device has the NSEP priority access authority, and the value of the first information being a second value (such as 0) indicates that the STA device does not have the NSEP priority access authority.

In response to that the AP device verifies that the STA device has the NSEP priority access authority, the value of the first information is set as the first value, otherwise, the value of the first information is set as 0.

Taking the first information having an INTEGER type as an example, the value of the first information being a first value indicates that the STA device has the NSEP priority access authority, and the value of the first information being a second value indicates that the STA device does not have the NSEP priority access authority.

As an example, the first value may be 1 or y, and the second value is 0 or x. Here, $-32768 \le x \le 32768$, $-32768 \le y \le 32768$, $x \ne 1$, $y \ne 0$, and $x \ne y$.

Then, in response to that the AP device verifies that the STA device has the NSEP priority access authority, the value of the first information may be set as 1 or y, otherwise, the value of the first information may be set as 0 or x.

In some embodiments, a data type of the second information is one of TruthValue, BOOL, BITS, or INTEGER.

In some embodiments, the operation S820 further includes the following operations.

A value of the second information is set as a third value in case that it is determined that the STA device has the NSEP priority access authority of the non-MLD identity according to the NSEP priority access service information of the STA device, and the third value is configured to indicate that the STA device supports NSEP priority access performed in the non-MLD identity.

Alternatively, the value of the second information is set as a fourth value in case that it is determined that the STA device does not have the NSEP priority access authority of the non-MLD identity according to the NSEP priority access service information of the STA device, and the fourth value is configured to indicate that the STA device does not support the NSEP priority access performed in the non-MLD identity.

Taking the second information having a BOOL type or a TruthValue type as an example, it is assumed that: the value of the second information being TRUE (i.e., 1) indicates that the STA device has the NSEP priority access authority of the non-MLD identity, and the value of the second information being FALSE (i.e., 0) indicates that the STA device does not have the NSEP priority access authority of the non-MLD identity. In the case that the AP device verifies that the STA device has the NSEP priority access authority of the non-MLD identity, the value of the second information may be set as 1, otherwise, the value of the second information may be set as 0.

Taking the second information having a BITS type as an example, the second information may include at least one bit, a value of the at least one bit being a third value (such as 1) indicates that the STA device has the NSEP priority access authority of the non-MLD identity, and the value of the second information being a fourth value (such as 0) indicates that the STA device does not have the NSEP priority access authority of the non-MLD identity. In the case that the AP device verifies that the STA device has the NSEP priority access authority of the non-MLD identity, the value of the second information may be set as 1, otherwise, the value of the second information may be set as 0.

Taking the second information having an INTEGER type as an example, the value of the second information being a third value indicates that the STA device has the NSEP priority access authority of the non-MLD identity, and the value of the third information being a fourth value indicates that the STA device does not have the NSEP priority access authority of the non-MLD identity.

As an example, the third value may be 1 or p, and the fourth value may be 0 or q. Here, $-32768 \le q \le 32768$, $-32768 \le p \le 32768$, $q \ne 1$, $p \ne 0$, and $p \ne q$. In the case that the AP device verifies that the STA device has the NSEP priority access authority of the non-MLD identity, the value of the first information may be set as 1 or p, otherwise, the value of the second information may be set as 0 or q.

In some embodiments, a data type of the third information is one of BOOL, BITS, or INTEGER.

In some embodiments, the operation S820 further includes the following operations.

A value of the second information is set as a fifth value in case that it is determined that the STA device has the NSEP priority access authority of the MLD identity according to the NSEP priority access service information of the STA device, and the fifth value is configured to indicate that the STA device supports NSEP priority access performed in the MLD identity.

Alternatively, the value of the second information is set as a sixth value in case that it is determined that the STA device does not have the NSEP priority access authority of the MLD identity according to the NSEP priority access service information of the STA device, and the sixth value is configured to indicate that the STA device does not support the NSEP priority access performed in the MLD identity.

Taking the third information having a BOOL type or a TruthValue type as an example, it is assumed that: the value of the third information being TRUE (i.e., 1) indicates that the STA device has the NSEP priority access authority of the MLD identity, and the value of the third information being FALSE (i.e., 0) indicates that the STA device does not have the NSEP priority access authority of the MLD identity. In response to that the AP device verifies that the STA device has the NSEP priority access authority of the MLD identity, the value of the third information may be set as 1, otherwise, the value of the third information may be set as 0.

Taking the third information having a BITS type as an example, the third information may include at least one bit, a value of the at least one bit being a fifth value (such as 1) indicates that the STA device has the NSEP priority access authority of the MLD identity, and the value of the third information being a sixth value (such as 0) indicates that the STA device does not have the NSEP priority access authority of the MLD identity. In response to that the AP device verifies that the STA device has the NSEP priority access authority of the MLD identity, the value of the third information may be set as 1, otherwise, the value of the third information may be set as 0.

Taking the third information having an INTEGER type as an example, the value of the third information being a fifth value indicates that the STA device has the NSEP priority access authority of the MLD identity, and the value of the third information being a sixth value indicates that the STA device does not have the NSEP priority access authority of the MLD identity.

As an example, the fifth value may be 1 or m, and the sixth value may be 0 or n. Here, $-32768 \leq n \leq 32768$, $-32768 \leq m \leq 32768$, $n \neq 1$, $m \neq 0$, and $m \neq n$. In response to that the AP device verifies that the STA device has the NSEP priority access authority of the MLD identity, the value of the first information may be set as 1 or m, otherwise, the value of the third information may be set as 0 or n.

In some embodiments, a data type of the fourth information is one of BITS, INTEGER, or Unsigned32.

In some embodiments, the operation S820 further includes the following operations.

A value of the fourth information is set as a seventh value in case that it is determined that the STA device has a first NSEP priority access priority according to the NSEP priority access service information of the STA device, and the seventh value is configured to indicate the first NSEP priority access priority.

Taking the fourth information having a BITS type as an example, the fourth information may include n bits which correspond to n priority orders. In response to that the AP device determines that priority of the NSEP priority access of the STA device is M according to the NSEP priority access service information of the STA device, a corresponding bit may be set as 1, and other bits may be set as 0. The smaller the value of M, the higher the priority. Alternatively, the greater the value of M, the higher the priority.

Taking the fourth information having an INTEGER type or an Unsigned32 type as an example, the value of the fourth information being an eighth value indicates that the STA device does not have the NSEP priority access authority, and the value of the fourth information being a seventh value indicates an NSEP priority access level of the STA device. The seventh value is different from the eighth value. In other words, whether there is an NSEP priority access authority and a specific NSEP priority access level may be indicated by the value of the fourth information.

As an example, the eighth value may be 0, and the seventh value may be another value except 0.

Optionally, the greater the value of the priority, the higher the priority. Alternatively, the smaller the value of the priority, the higher the priority.

The AP device sets the fourth information as 0 in response to that it is determined that the STA device does not have the NSEP priority access authority, and sets the fourth information as a corresponding value in response to that the STA device has a first NSEP priority access level.

Taking the fourth information having an Unsigned32 type as an example, the value of the fourth information being an eighth value indicates that the STA device does not have the NSEP priority access authority, and the value of the fourth information being a seventh value indicates an NSEP priority access level of the STA device. The seventh value is different from the eighth value. In other words, whether there is the NSEP priority access authority and a specific NSEP priority access level may be indicated by the value of the fourth information.

As an example, the eighth value may be 0, and the seventh value may be another value except 0.

Optionally, the greater the value of the priority, the higher the priority. Alternatively, the smaller the value of the priority, the higher the priority.

The AP device sets the fourth information as 0 in response to that it is determined that the STA device does not have the NSEP priority access authority, and sets the fourth information as a corresponding value in response to that the STA device has the first NSEP priority access level.

In summary, in the embodiments of the disclosure, the AP device may update data according to corresponding data type and update method by defining type and update method of data in the dot11NonAPStationAuthNSEPPriorityAccesstype, and correspondingly, the AP device may also interpret the data according to the corresponding data type, so as to verify permission related to the NSEP priority access of the STA device.

It should be understood that the method 800 may be separately implemented, or may be implemented in combination with the foregoing embodiment 200. For example, the first AP device may transfer the dot11NonAPStationAuthNSEPPriorityAccesstype updated according to the method 800 to the second AP device, and the second AP device may interpret the dot11NonAPStationAuthNSEPPriorityAccesstype according to the corresponding data type, so as to verify the NSEP priority access authority of the STA device.

Figure 25:
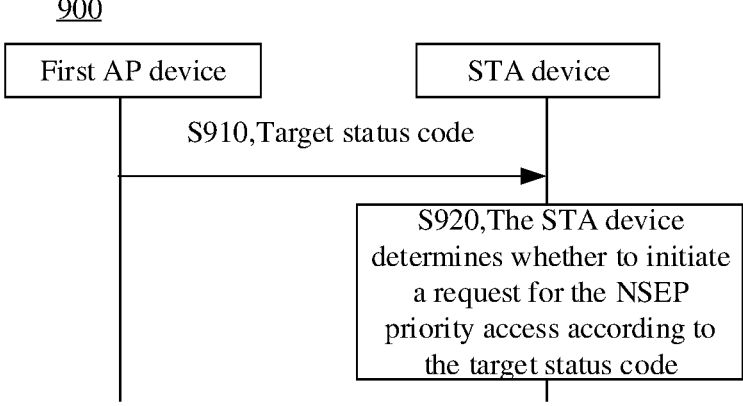
FIG. 25 is an interaction diagram of yet another method for wireless communication according to an embodiment of the disclosure.

FIG. 25 is a flowchart of yet another method for wireless communication according to an embodiment of the disclosure. As shown in FIG. 25, the method 900 may include the following operations.

At S910, an STA device receives a target status code sent by a first AP device. The target status code is configured to indicate a state related to NSEP priority access, and the first AP device is an AP device currently associated with the STA device.

At S920, the STA device determines whether to initiate a request for the NSEP priority access according to the target status code.

It should be understood that in the embodiment of the disclosure, the status code related to the NSEP priority access may include, but is not limited to at least one of:

a first status code (denoted by SUCCESS), configured to indicate that the STA device has the NSEP priority access authority;

a second status code (denoted by NSEP_DENIED_UN-AUTHORIZED), configured to indicate that the STA device does not have the NSEP priority access authority. For example, the non-AP MLD or the non-AP EHT STA is not authorized to use the NSEP priority access service;

a third status code (denoted by NSEP_DENIE-D_OTHER_REASON), configured to indicate that the STA device is temporarily denied to use the NSEP priority access. For example, the NSEP priority access is denied due to other reasons except the standard; or a fourth status code (denoted by NSEP_DELAYED_AU-THORIZATION), configured to indicate that the STA device needs to delay the request for the NSEP priority access. For example, in case that a number of STAs currently requesting the NSEP priority access service is too many, the AP may reply with this status code.

Optionally, in some embodiments, the STA device determines whether to initiate the request for the NSEP priority access according to the target status code, which may include the following operations.

The STA device determines whether to initiate the request for the NSEP priority access to the first AP device again according to the target status code.

For example, in response to that the target status code is the fourth status code, the STA device may delay initiating the NSEP priority access again to the first AP device.

For another example, in response to that the target status code is the second status code or the first status code, the STA device may determine not to initiate the request for NSEP priority access again to the first AP device.

For yet another example, in response to that the target status code is the third status code, the STA device may determine to initiate the request for the NSEP priority access again to the first AP device.

Optionally, in some other embodiments, the STA device determines whether to initiate the request for the NSEP priority access according to the target status code, which may include the following operations.

The STA device determines whether to initiate the request for the NSEP priority access to a second AP device according to the target status code. The second AP device is an AP device to be associated with the STA device, i.e., a target AP in BSS transition.

That is, the STA device may determine whether to initiate the request for the NSEP priority access to the target AP according to the target status code replied by the current AP.

In some embodiments, the target status code is the first status code, and the STA device determines to initiate the request for the NSEP priority access to the second AP device. For example, the STA device may send an NSEP Priority Access Enable Request frame to the second AP device to request enabling the NSEP priority access.

In some embodiments, in response to that the target status code is the second status code, it is indicated that the STA device does not have the NSEP priority access authority. Even though the NSEP priority access is requested to the second AP device, the NSEP priority access may also be denied. In this case, the STA device determines not to initiate the request for the NSEP priority access to the second AP device. That is, the STA device does not send the NSEP Priority Access Enable Request frame to the second AP device.

In some embodiments, when the target status code is the third status code, it is indicated that the STA device is temporarily denied to use the NSEP priority access (that is, the first AP device does not deny the NSEP priority access of the STA device due to absence of the NSEP priority access authority). In this case, the STA device determines to initiate the request for the NSEP priority access request to the second AP device. For example, the NSEP Priority Access Enable Request frame may be sent to the second AP device to request enabling the NSEP priority access.

In some embodiments, in the case that the target status code is the fourth status code, it is indicated that the first AP device does not perform NSEP priority access verification temporarily, and the STA device needs to wait for a period of time to try the NSEP priority access again (that is, the first AP device does not deny the NSEP priority access of the STA device due to absence of the NSEP priority access authority). In this case, the STA device may determine to initiate the request for the NSEP priority access request to the second AP device. For example, the STA device may send the NSEP Priority Access Enable Request frame to the second AP device to request enabling the NSEP priority access.

In summary, in the embodiments of the disclosure, operation of the STA device after receiving the status code related to the NSEP priority access of the AP device is designed, so that after receiving the status code related to the NSEP priority access of the AP device, the STA device may perform a corresponding operation according to the status code, thereby ensuring efficiency of the NSEP priority access service.

It should be understood that the method 900 may be separately implemented, or may be implemented in combination with the foregoing embodiment 200. For example, after receiving the target status code replied by the first AP device, the STA device may perform the operation described in the method 900 according to the target status code.

The method embodiments of the disclosure are described in detail above with reference to FIG. 4 to FIG. 25, and device embodiments of the disclosure are described in detail below with reference to FIG. 26 to FIG. 32. It should be understood that the device embodiments correspond to the method embodiments, and similar descriptions may refer to the method embodiments.

Figure 26:
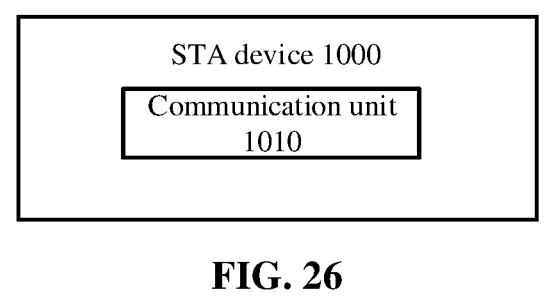

FIG. 26 shows a block diagram of an STA device 1000 according to an embodiment of the disclosure. As shown in FIG. 26, the STA device 1000 includes a communication unit 1010.

The communication unit 1010 is configured to send a first request frame to a first AP device, and the first request frame includes at least first indication information or second indication information.

The first indication information is configured to indicate whether the STA device requests the first AP device to transfer NSEP priority access permission of the STA device to a second AP device. The second indication information is configured to indicate whether the STA device requests for acquiring an EDCA parameter set. The first AP device is an AP device currently associated with the STA device. The second AP device is a target AP device to be associated with the STA device.

In some embodiments, the first request frame is an FT request frame.

In some embodiments, the first request frame includes an NSEP priority access permission transfer request element which is configured to carry the first indication information.

Alternatively, the first request frame includes an NSEP priority access permission transfer request field which is configured to carry the first indication information.

In some embodiments, the first request frame is an FT request frame, and an FT request frame body of the FT request frame includes the NSEP priority access permission transfer request element or the NSEP priority access permission transfer request field.

In some embodiments, the first request frame includes an EDCA parameter set request element which is configured to carry the second indication information.

Alternatively, the first request frame includes an EDCA parameter set request field which is configured to carry the second indication information.

In some embodiments, the first request frame is an FT request frame, and an FT request frame body of the FT request frame includes the EDCA parameter set request element or the EDCA parameter set request field.

In some embodiments, the communication unit 1010 is further configured to receive a first response frame sent by the first AP device.

The first response frame includes at least a target status code or a target EDCA parameter set, and the target status code is configured to indicate a transfer result of the NSEP priority access permission of the STA device.

In some embodiments, the first response frame is an FT response frame.

In some embodiments, the first response frame includes an NSEP priority access permission transfer response element which is configured to carry the target status code.

Alternatively, the first response frame includes an NSEP priority access permission transfer response field which is configured to carry the target status code.

In some embodiments, the first response frame is an FT response frame, and an FT response frame body of the FT response frame includes the NSEP priority access permission transfer response element or the NSEP priority access permission transfer response field.

In some embodiments, the first response frame includes an EDCA parameter set element which is configured to carry the target EDCA parameter set.

Alternatively, the first response frame includes an EDCA parameter set field which is configured to carry the target EDCA parameter set.

In some embodiments, the first response frame is an FT response frame, and an FT response frame body of the FT response frame includes the EDCA parameter set element or the EDCA parameter set field.

In some embodiments, the communication unit 1010 is further configured to:

send a reassociation request frame to the second AP device in case that the target status code indicates that the transfer result of the NSEP priority access permission is successful.

Optionally, in some embodiments, the communication unit may be a communication interface or a transceiver, or an input/output (I/O) interface of a communication chip or of a system-on-chip (SOC). The processing unit may be one or more processors.

It should be understood that the STA device 1000 according to the embodiments of the disclosure may correspond to the STA device in the method embodiments of the disclosure, and the foregoing and other operations and/or functions of various units in the STA device 1000 implement corresponding processes of the STA device in the method embodiments shown in FIG. 4 to FIG. 23 respectively, which are not elaborated here for the sake of brevity.

Figure 27:
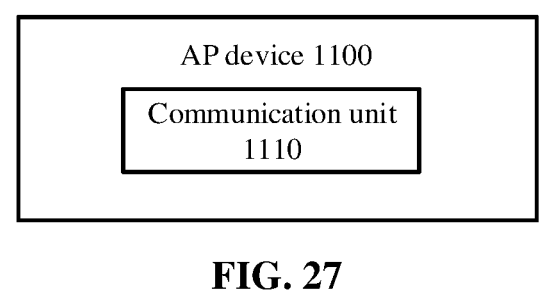

FIG. 27 is a block diagram of an AP device according to an embodiment of the disclosure. The AP device 1100 of FIG. 27 includes a communication unit 1110.

The communication unit 1110 is configured to send NSEP priority access permission of an STA device to a second AP device. The AP device is an AP device currently associated with the STA device, and the second AP device is a target AP device to be associated with the STA device.

In some embodiments, the communication unit 1110 is further configured to:

send the NSEP priority access permission of the STA device to the second AP device through state transfer of an interworking procedure.

In some embodiments, the communication unit 1110 is further configured to send a second request frame to the second AP device.

The second request frame includes the NSEP priority access permission of the STA device.

In some embodiments, the second request frame is a remote request frame.

In some embodiments, the second request frame includes an NSEP priority access permission element which is configured to carry the NSEP priority access permission of the STA device.

Alternatively, the second request frame includes an NSEP priority access permission field which is configured to carry the NSEP priority access permission of the STA device.

In some embodiments, the second request frame is a remote request frame, and an FT request frame body of an FT request frame in the remote request frame includes the NSEP priority access permission element or the NSEP priority access permission field.

In some embodiments, the second request frame further includes at least third indication information or a first EDCA parameter set, and the third indication information is configured to indicate whether the STA device requests an EDCA parameter set.

In some embodiments, the second request frame includes an EDCA parameter set request element which is configured to carry the third indication information.

Alternatively, the second request frame includes an EDCA parameter set request field which is configured to carry the third indication information.

In some embodiments, the second request frame is a remote request frame, and an FT request frame body of an FT request frame in the remote request frame includes the EDCA parameter set request element or the EDCA parameter set request field.

In some embodiments, the second request frame includes an EDCA parameter set element which is configured to carry the first EDCA parameter set; or Alternatively, the second request frame includes an EDCA parameter set field which is configured to carry the first EDCA parameter set.

In some embodiments, the second request frame is a remote request frame, and an FT request frame body of an FT request frame in the remote request frame includes the EDCA parameter set element or the EDCA parameter set field.

In some embodiments, the communication unit 1110 is further configured to receive a second response frame sent by the second AP device.

The second response frame includes a target status code which is configured to indicate a transfer result of the NSEP priority access permission of the STA device.

In some embodiments, the second response frame is a remote response frame.

In some embodiments, the second response frame includes an NSEP priority access permission response element which is configured to carry the target status code.

Alternatively, the second response frame includes an NSEP priority access permission response field which is configured to carry the target status code.

In some embodiments, the second response frame is a remote response frame, and an FT response frame body of an FT response frame in the remote response frame includes the NSEP priority access permission response element or the NSEP priority access permission response field.

In some embodiments, the second response frame further includes at least fourth indication information or a second EDCA parameter set, and the fourth indication information is configured to indicate whether the second AP device accepts an EDCA parameter set suggested by the AP device.

In some embodiments, the second response frame includes an EDCA parameter set response element which is configured to carry the fourth indication information.

Alternatively, the second response frame includes an EDCA parameter set response field which is configured to carry the fourth indication information.

In some embodiments, the second response frame is a remote response frame, and an FT response frame body of an FT response frame in the remote response frame includes the EDCA parameter set response element or the EDCA parameter set response field.

In some embodiments, the second response frame is an EDCA parameter set element which is configured to carry the second EDCA parameter set.

Alternatively, the second response frame includes an EDCA parameter set field which is configured to carry the second EDCA parameter set.

In some embodiments, the second response frame is a remote response frame, and an FT response frame body of an FT response frame in the remote response frame includes the EDCA parameter set element or the EDCA parameter set field.

In some embodiments, the communication unit 1110 is further configured to receive a first request frame sent by the STA device.

The first request frame includes at least first indication information or second indication information. The first indication information is configured to indicate whether the STA device requests the AP device to transfer the NSEP priority access permission of the STA device to the second AP device, and the second indication information is configured to indicate whether the STA device requests for acquiring an EDCA parameter set.

In some embodiments, the first request frame is an FT request frame.

In some embodiments, the first request frame includes an NSEP priority access permission transfer request element which is configured to carry the first indication information.

Alternatively, the first request frame includes an NSEP priority access permission transfer request field which is configured to carry the first indication information.

In some embodiments, the first request frame is an FT request frame, and an FT request frame body of the FT request frame includes the NSEP priority access permission transfer request element or the NSEP priority access permission transfer request field.

In some embodiments, the first request frame includes an EDCA parameter set request element which is configured to carry the second indication information.

Alternatively, the first request frame includes an EDCA parameter set request field which is configured to carry the second indication information.

In some embodiments, the first request frame is an FT request frame, and an FT request frame body of the FT request frame includes the EDCA parameter set request element or the EDCA parameter set request field.

In some embodiments, the communication unit 1110 is further configured to send a first response frame to the STA device.

The first response frame includes at least a target status code or a target EDCA parameter set, and the target status code is configured to indicate a transfer result of the NSEP priority access permission of the STA device.

In some embodiments, the first response frame is an FT response frame.

In some embodiments, the first response frame includes an NSEP priority access permission transfer response element which is configured to carry the target status code.

Alternatively, the first response frame includes an NSEP priority access permission transfer response field which is configured to carry the target status code.

In some embodiments, the first response frame is an FT response frame, and an FT response frame body of the FT response frame includes the NSEP priority access permission transfer response element or the NSEP priority access permission transfer response field.

In some embodiments, the first response frame includes an EDCA parameter set element which is configured to carry the target EDCA parameter set.

Alternatively, the first response frame includes an EDCA parameter set field which is configured to carry the target EDCA parameter set.

In some embodiments, the first response frame is an FT response frame, and an FT response frame body of the FT response frame includes the EDCA parameter set element or the EDCA parameter set field.

In some embodiments, the second AP device and the STA device establish connection through a reassociation process. The state transfer belongs to the reassociation process, and the state transfer is performed after a reassociation response frame in the reassociation process.

In some embodiments, the second AP device and the STA device establish connection through a reassociation process, and the state transfer is performed after the reassociation process.

Optionally, in some embodiments, the communication unit may be a communication interface or a transceiver, or an I/O interface of a communication chip or a SOC. The processing unit may be one or more processors.

It should be understood that the AP device 1100 according to the embodiments of the disclosure may correspond to the first AP device in the method embodiments of the disclosure, and the foregoing and other operations and/or functions of each unit in the AP device 1100 implement corresponding processes of the first AP device in the method embodiments shown in FIG. 4 to FIG. 23 respectively, which are not elaborated here for the sake of brevity.

Figure 28:
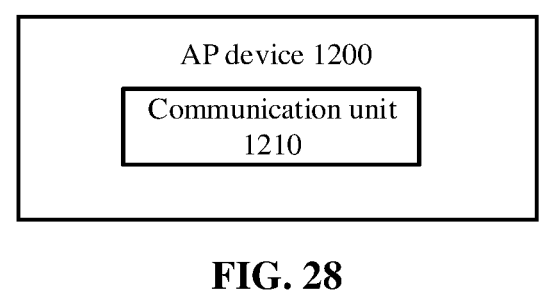

FIG. 28 is a block diagram of an AP device according to an embodiment of the disclosure. The AP device 1200 of FIG. 28 includes a communication unit 1210.

The communication unit 1210 is configured to receive NSEP priority access permission of an STA device sent by a first AP device, the first AP device is an AP device currently associated with the STA device, and the AP device is a target AP device to be associated with the STA device.

Optionally, in some embodiments, the communication unit 1210 is further configured to:

receive the NSEP priority access permission of the STA device sent by the first AP device through state transfer of an interworking procedure.

In some embodiments, the communication unit 1210 is further configured to receive a second request frame sent by the first AP device.

The second request frame includes the NSEP priority access permission of the STA device.

In some embodiments, the second request frame is a remote request frame.

In some embodiments, the second request frame includes an NSEP priority access permission element which is configured to carry the NSEP priority access permission of the STA device.

Alternatively, the second request frame includes an NSEP priority access permission field which is configured to carry the NSEP priority access permission of the STA device.

In some embodiments, the second request frame is a remote request frame, and an FT request frame body of an FT request frame in the remote request frame includes the NSEP priority access permission element or the NSEP priority access permission field.

In some embodiments, the second request frame further includes at least third indication information or a first EDCA parameter set, and the third indication information is configured to indicate whether the STA device requests an EDCA parameter set.

In some embodiments, the second request frame includes an EDCA parameter set request element which is configured to carry the third indication information.

Alternatively, the second request frame includes an EDCA parameter set request field which is configured to carry the third indication information.

In some embodiments, the second request frame is a remote request frame, and an FT request frame body of an FT request frame in the remote request frame includes the EDCA parameter set request element or the EDCA parameter set request field.

In some embodiments, the second request frame includes an EDCA parameter set element which is configured to carry the first EDCA parameter set.

Alternatively, the second request frame includes an EDCA parameter set field which is configured to carry the first EDCA parameter set.

In some embodiments, the second request frame is a remote request frame, and an FT request frame body of an FT request frame in the remote request frame includes the EDCA parameter set element or the EDCA parameter set field.

In some embodiments, the communication unit 1210 is further configured to send a second response frame to the first AP device.

The second response frame includes a target status code which is configured to indicate a transfer result of the NSEP priority access permission of the STA device.

In some embodiments, the second response frame is a remote response frame.

In some embodiments, the second response frame includes an NSEP priority access permission response element which is configured to carry the target status code.

Alternatively, the second response frame includes an NSEP priority access permission response field which is configured to carry the target status code.

In some embodiments, the second response frame is a remote response frame, and an FT response frame body of an FT response frame in the remote response frame includes the NSEP priority access permission response element or the NSEP priority access permission response field.

In some embodiments, the second response frame further includes at least fourth indication information or a second EDCA parameter set, and the fourth indication information is configured to indicate whether the AP device accepts an EDCA parameter set suggested by the first AP device.

In some embodiments, the second response frame includes an EDCA parameter set response element which is configured to carry the fourth indication information.

Alternatively, the second response frame includes an EDCA parameter set response field which is configured to carry the fourth indication information.

In some embodiments, the second response frame is a remote response frame, and an FT response frame body of an FT response frame in the remote response frame includes the EDCA parameter set response element or the EDCA parameter set response field.

In some embodiments, the second response frame is an EDCA parameter set element which is configured to carry the second EDCA parameter set.

Alternatively, the second response frame includes an EDCA parameter set field which is configured to carry the second EDCA parameter set.

In some embodiments, the second response frame is a remote response frame, and an FT response frame body of an FT response frame in the remote response frame includes the EDCA parameter set element or the EDCA parameter set field.

In some embodiments, the AP device and the STA device establish connection through a reassociation process. The state transfer belongs to the reassociation process, and the state transfer is performed after a reassociation response frame in the reassociation process.

In some embodiments, the AP device and the STA device establish connection through a reassociation process, and the state transfer is performed after the reassociation process.

It should be understood that the AP device 1200 according to the embodiments of the disclosure may correspond to the second AP device in the method embodiments of the disclosure, and the foregoing and other operations and/or functions of each unit in the AP device 1200 implement corresponding processes of the second AP device in the method embodiments shown in FIG. 4 to FIG. 23 respectively, which are not elaborated here for the sake of brevity.

Figure 29:
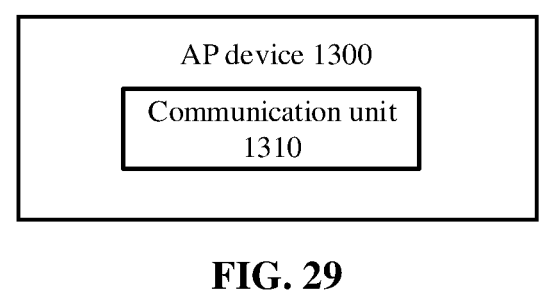

FIG. 29 is a block diagram of an AP device according to an embodiment of the disclosure. The AP device 1300 of FIG. 29 includes a processing unit 1310.

The processing unit 1310 is configured to: acquire NSEP priority access service information of an STA device; and determine dot11NonAPStationAuthNSEPPriorityAccesstype of the STA device in dot11InterworkingEntry according to the NSEP priority access service information of the STA device.

In some embodiments, the dot11NonAPStationAuthNSEPPriorityAccesstype includes at least one of:

first information, configured to indicate whether the STA device has an NSEP priority access authority;

second information, configured to indicate whether the STA device has an NSEP priority access authority of a non-MLD identity;

third information, configured to indicate whether the STA device has an NSEP priority access authority of an MLD identity; or fourth information, configured to indicate priority information of NSEP priority access of the STA device.

In some embodiments, a data type of the first information is one of TruthValue, BOOL, BITS, or INTEGER.

In some embodiments, a data type of the second information is one of TruthValue, BOOL, BITS, or INTEGER.

In some embodiments, a data type of the third information is one of TruthValue, BOOL, BITS, or INTEGER.

In some embodiments, a data type of the fourth information is one of BITS, INTEGER, or Unsigned32.

In some embodiments, the processing unit 1310 is further configured to set a value of the first information as a first value in case that it is determined that the STA device has the NSEP priority access authority according to the NSEP priority access service information of the STA device. The first value is configured to indicate that the STA device has the NSEP priority access authority; or set the value of the first information as a second value in case that it is determined that the STA device does not have the NSEP priority access authority according to the NSEP priority access service information of the STA device. The second value is configured to indicate that the STA device does not have the NSEP priority access authority.

In some embodiments, the processing unit 1310 is further configured to:

set a value of the second information as a third value in case that it is determined that the STA device has the NSEP priority access authority of the non-MLD identity according to the NSEP priority access service information of the STA device. The third value is configured to indicate that the STA device supports NSEP priority access performed in the non-MLD identity; or set the value of the second information as a fourth value in case that it is determined that the STA device does not have the NSEP priority access authority of the non-MLD identity according to the NSEP priority access service information of the STA device. The fourth value is configured to indicate that the STA device does not support the NSEP priority access performed in the non-MLD identity.

In some embodiments, the processing unit 1310 is further configured to:

set a value of the third information as a fifth value in case that it is determined that the STA device has the NSEP priority access authority of the MLD identity according to the NSEP priority access service information of the STA device. The fifth value is configured to indicate that the STA device supports NSEP priority access performed in the MLD identity; or set the value of the third information as a sixth value in case that it is determined that the STA device does not have the NSEP priority access authority of the MLD identity according to the NSEP priority access service information of the STA device. The sixth value is configured to indicate that the STA device does not support the NSEP priority access performed in the MLD identity.

In some embodiments, the processing unit 1310 is further configured to:

set a value of the fourth information as a seventh value in case that it is determined that the STA device has a first NSEP priority access priority according to the NSEP priority access service information of the STA device. The seventh value is configured to indicate the first NSEP priority access priority.

It should be understood that the AP device 1300 according to the embodiments of the disclosure may correspond to the AP device in the method embodiments of the disclosure, and the foregoing and other operations and/or functions of each unit in the AP device 1300 implement corresponding processes of the AP device in the method embodiment shown in FIG. 24 respectively, which are not elaborated here for the sake of brevity.

Figure 30:
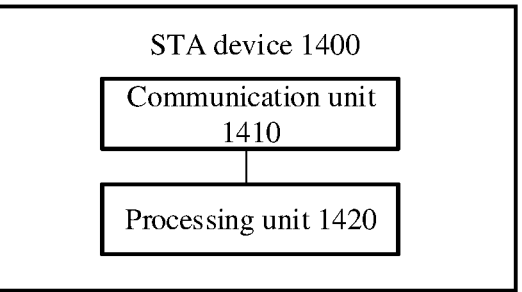
FIG. 30 is a block diagram of another STA device according to an embodiment of the disclosure.

FIG. 30 is a block diagram of an STA device according to an embodiment of the disclosure. The STA device 1400 of FIG. 30 includes a communication unit 1410 and a processing unit 1420.

The communication unit 1410 is configured to receive a target status code sent by a first AP device. The target status code is configured to indicate a state related to NSEP priority access, and the first AP device is an AP device currently associated with the STA device.

The processing unit 1420 is configured to determine whether to initiate a request for NSEP priority access according to the target status code.

In some embodiments, the target status code is a first status code which is configured to indicate that the STA device has an NSEP priority access authority.

In some embodiments, the processing unit 1420 is further configured to determine to initiate the request for the NSEP priority access to a second AP device in case that the target status code is the first status code.

The second AP device is a target AP device to be associated with the STA device.

In some embodiments, the target status code is a second status code which is configured to indicate that the STA device does not have an NSEP priority access authority.

In some embodiments, the processing unit 1420 is further configured to determine not to initiate the request for the NSEP priority access to a second AP device in case that the target status code is the second status code.

The second AP device is a target AP device to be associated with the STA device.

In some embodiments, the target status code is a third status code which is configured to indicate that the STA device is temporarily denied to use the NSEP priority access.

In some embodiments, the processing unit 1420 is further configured to determine to initiate the request for the NSEP priority access to a second AP device in case that the target status code is the third status code.

The second AP device is a target AP device to be associated with the STA device.

In some embodiments, the target status code is a fourth status code which is configured to indicate that the STA device needs to delay the NSEP priority access request.

In some embodiments, the processing unit 1420 is further configured to determine to initiate the request for the NSEP priority access to a second AP device in case that the target status code is the fourth status code.

The second AP device is a target AP device to be associated with the STA device.

It should be understood that the STA device 1400 according to the embodiments of the disclosure may correspond to the STA device in the method embodiments of the disclosure, and the foregoing and other operations and/or functions of each unit in the STA device 1400 implement corresponding processes of the STA device in the method embodiment shown in FIG. 25 respectively, which are not elaborated here for the sake of brevity.

Figure 31:
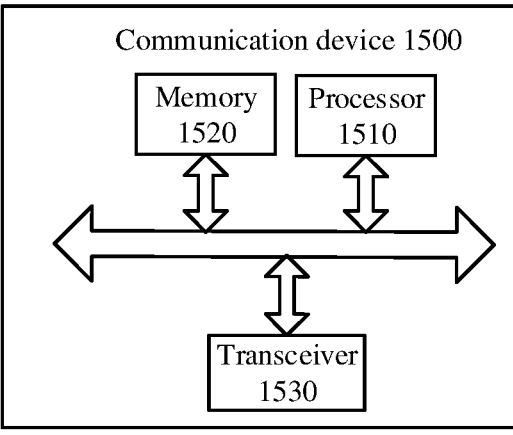
FIG. 31 is a block diagram of a communication device according to an embodiment of the disclosure.

FIG. 31 is a structural diagram of a communication device 1500 according to an embodiment of the disclosure. The communications device 1500 shown in FIG. 31 includes a processor 1510, and the processor 1510 may call and run a computer program from a memory to implement the methods in the embodiments of the disclosure.

Optionally, as shown in FIG. 31, the communications device 1500 may further include a memory 1520, and the processor 1510 may call and run a computer program from the memory 1520 to implement the methods in the embodiments of the disclosure.

The memory 1520 may be a separate device independent of the processor 1510, or may be integrated in the processor 1510.

Optionally, as shown in FIG. 31, the communication device 1500 may further include a transceiver 1530, and the processor 1510 may control the transceiver 1530 to communicate with other devices. Specifically, the processor 1510 may control the transceiver 1530 to send information or data to other devices, or receive information or data sent by other devices.

The transceiver 1530 may include a transmitter and a receiver. The transceiver 1530 may further include an antenna, and there may be one or more antennas.

Optionally, the communication device 1500 may specifically be the AP device in the embodiments of the disclosure, such as the first AP device and the second AP device, and the communication device 1500 may implement corresponding processes implemented by the AP device in each method of the embodiments of the disclosure, which are not elaborated here for the sake of brevity.

Optionally, the communications device 1500 may specifically be the STA device in the embodiments of the disclosure, and the communication device 1500 may implement corresponding processes implemented by the STA device in each method of the embodiments of the disclosure, which are not elaborated here for the sake of brevity.

Figure 32:
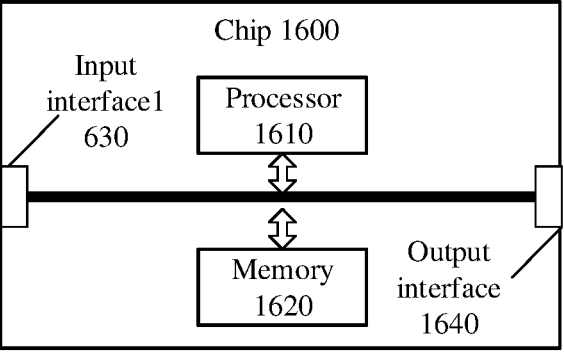
FIG. 32 is a block diagram of a chip according to an embodiment of the disclosure.

FIG. 32 is a structural diagram of a chip according to an embodiment of the disclosure. The chip 1600 shown in FIG. 32 includes a processor 1610, and the processor 1610 may call and run a computer program from a memory to implement the methods in the embodiments of the disclosure.

Optionally, as shown in FIG. 32, the chip 1600 may further include a memory 1620, and the processor 1610 may call and run a computer program from the memory 1620 to implement the methods in the embodiments of the disclosure.

The memory 1620 may be a separate device independent of the processor 1610, or may be integrated in the processor 1610.

Optionally, the chip 1600 may further include an input interface 1630. The processor 1610 may control the input interface 1630 to communicate with other devices or chips. Specifically, the processor 1610 may control the input interface 1630 to acquire information or data sent by other devices or chips.

Optionally, the chip 1600 may further include an output interface 1640. The processor 1610 may control the output interface 1640 to communicate with other devices or chips. Specifically, the processor 1610 may control the output interface 1640 to output information or data to other devices or chips.

Optionally, the chip may be applied to the AP device in the embodiments of the disclosure, such as the first AP device and the second AP device, and the chip may implement corresponding processes implemented by the AP device in each method of the embodiments of the disclosure, which are not elaborated here for the sake of brevity.

Optionally, the chip may be applied to the STA device in the embodiments of the disclosure, and the chip may implement corresponding processes implemented by the STA device in each method of the embodiments of the disclosure, which are not elaborated here for the sake of brevity.

It should be understood that the chip mentioned in the embodiments of the disclosure may also be referred to as a system-level chip, a system chip, a chip system, or a SOC chip, etc.

It should be understood that the processor in the embodiments of the present disclosure may be an integrated circuit chip having signal processing capability. In implementation, the various operations of the above method embodiments may be accomplished by integrated logic circuit of hardware or instructions in the form of software in a processor. The processor may be a general purpose processor, a Digital Signal Processor (DSP), an Application Specific Integrated Circuit (ASIC), a Field Programmable Gate Array (FPGA) or other programmable logic devices, a discrete gate or transistor logic device, or a discrete hardware component. The methods, operations and logic block diagrams disclosed in embodiments of the present disclosure may be implemented or performed. The general purpose processor may be a microprocessor or the processor may be any conventional processor or the like. The operations of the method disclosed in combination with the embodiments of the present disclosure can be directly embodied as execution of a hardware decoding processor or combined execution of hardware and software modules in the decoding processor. The software module may be located in a Random-Access Memory (RAM), a flash memory, a Read-Only Memory (ROM), a Programmable ROM (PROM) or an Electrically Erasable EPROM (EEPROM), a register and other storage medium mature in the art. The storage medium is located in the memory, and the processor reads information in the memory and completes the operations of the above methods in combination with its hardware.

It is understood that the memory in embodiments of the present disclosure may be volatile memory or non-volatile memory or may include both volatile and non-volatile memory. The non-volatile memory may be an ROM, a PROM, an Erasable PROM (EPROM), an EEPROM, or a flash memory. The volatile memory may be an RAM which serves as an external cache. By way of illustration but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include but not be limited to these and any other suitable types of memories.

It should be understood that the memory described above is exemplary but not limiting. For example, the memory in embodiments of the present disclosure may also be a SRAM, a DRAM, a SDRAM, a DDR SDRAM, an ESDRAM, an SLDRAM, a DR RAM, etc. That is, the memory in embodiments of the present disclosure is intended to include but not be limited to these and any other suitable types of memories.

An embodiment of the disclosure further provides a computer-readable storage medium, the computer-readable storage medium is configured to store a computer program.

Optionally, the computer-readable storage medium may be applied to the AP device in the embodiments of the disclosure, and the computer program causes a computer to execute corresponding processes implemented by the AP device in various methods of the embodiments of the disclosure, which are not elaborated here for the sake of brevity.

Optionally, the computer-readable storage medium may be applied to the STA device in the embodiments of the disclosure, and the computer program causes a computer to execute corresponding processes implemented by the STA device in various methods of the embodiments of the disclosure, which are not elaborated here for the sake of brevity.

An embodiment of the disclosure further provides a computer program product, the computer program product includes computer program instructions.

Optionally, the computer program product may be applied to the AP device in the embodiments of the disclosure, and the computer program instructions cause a computer to execute corresponding processes implemented by the AP in various methods of the embodiments of the disclosure, which are not elaborated here for the sake of brevity.

Optionally, the computer program product may be applied to the STA device in the embodiments of the disclosure, and the computer program instructions cause a computer to execute corresponding processes implemented by the STA device in various methods of the embodiments of the disclosure, which are not elaborated here for the sake of brevity.

An embodiment of the disclosure further provides a computer program.

Optionally, the computer program may be applied to the AP device in the embodiments of the disclosure, such as the first AP device and the second AP device, and the computer program causes a computer to execute corresponding processes implemented by the first AP device or the second AP device in various methods of the embodiments of the disclosure when the computer program is run on the computer, which are not elaborated here for the sake of brevity.

Optionally, the computer program may be applied to the STA device in the embodiments of the disclosure, and the computer program causes a computer to execute corresponding processes implemented by the STA device in various methods of the embodiments of the disclosure when the computer program is run on the computer, which are not elaborated here for the sake of brevity.

Those of ordinary skill in the art would appreciate that the various example units and algorithm steps described in connection with the embodiments in the present disclosure can be implemented in electronic hardware or a combination of computer software and electronic hardware. Whether these functions are performed in hardware or software depends on the specific application and design constraints of the technical solutions. Those of ordinary skill may use different methods for each particular application to implement the described functionality, but such implementation should not be considered outside the scope of the present disclosure.

Those skilled in the art would clearly appreciate that, for convenience and brevity of description, the specific operating processes of the above-described systems, devices and units may refer to the corresponding processes in the aforementioned method embodiments and would not be repeated herein.

In several embodiments provided in the present disclosure, it should be understood that the disclosed systems, devices and methods may be implemented in other ways. For example, the above-described embodiments of the devices are only schematic, for example, the division of the unit is only a logical function division, and in practice, there may be another division method, for example, multiple units or components may be combined or integrated into another system, or some features may be ignored or not performed. Furthermore, the coupling or direct coupling or communication connection between each other illustrated or discussed may be indirect coupling or communication connection through some interface, device or unit, and may be electrical, mechanical or other form.

The units illustrated as separate components may or may not be physically separated, and the components displayed as unit may or may not be physical units, that is, the units and the components may be located in one place, or may be distributed over multiple network units. Part or all of the units can be selected according to the actual needs to achieve the purpose of the embodiments.

In addition, various functional units in the embodiments of the present disclosure may be integrated in one processing unit, or various units may exist physically alone, or two or more units may be integrated in one unit.

The functions may be stored in a computer readable storage medium if implemented in the form of software functional units and sold or used as stand-alone products. In view of this understanding, the technical solutions of the present disclosure can be embodied in the form of a software product in essence or the part that contributes to the related art or the part of the technical solutions. The computer software product is stored in a storage medium and includes instructions that enables a computer device (which may be a personal computer, server, network device, etc.) to perform all or part of the operations of the methods described in various embodiments of the present disclosure. The aforementioned storage medium includes a U disk, a removable hard disk, a ROM, a RAM, a magnetic disk or an optical disk and other medium capable of storing program codes.

The above-mentioned is only the specific implementation of the present disclosure, but the scope of protection of the present disclosure is not limited thereto. Any variation or substitution readily conceivable by those skilled in the art within the scope of the technology disclosed in the present disclosure shall be covered by the scope of protection of the present disclosure. Therefore, the scope of protection of the present disclosure should be subject to the scope of protection of the claims.

What is claimed is:

1. A method for wireless communication, comprising:
   sending, by a station (STA) device, a first request frame to a first Access Point (AP) device, the first request frame comprising at least first indication information or second indication information,
   wherein the first indication information is configured to indicate whether the STA device requests the first AP device to transfer National Security and Emergency Preparedness (NSEP) priority access permission of the STA device to a second AP device, the second indication information is configured to indicate whether the STA device requests for acquiring an Enhanced Distributed Channel Access (EDCA) parameter set, the first AP device is an AP device currently associated with the STA device, and the second AP device is a target AP device to be associated with the STA device.

2. The method of claim 1, wherein the first request frame is a Fast basic service set Transition (FT) request frame.

3. The method of claim 1, wherein the first request frame comprises an NSEP priority access permission transfer request element which is configured to carry the first indication information; or
   the first request frame comprises an NSEP priority access permission transfer request field which is configured to carry the first indication information.

4. The method of claim 3, wherein the first request frame is a Fast basic service set Transition (FT) request frame, and an FT request frame body of the FT request frame comprises the NSEP priority access permission transfer request element or the NSEP priority access permission transfer request field.

5. A station (STA) device, comprising:
a memory; and
a processor,
wherein the processor is configured to:
send a first request frame to a first Access Point (AP) device, the first request frame comprising at least first indication information or second indication information,
wherein the first indication information is configured to indicate whether the STA device requests the first AP device to transfer National Security and Emergency Preparedness (NSEP) priority access permission of the STA device to a second AP device, the second indication information is configured to indicate whether the STA device requests for acquiring an Enhanced Distributed Channel Access (EDCA) parameter set, the first AP device is an AP device currently associated with the STA device, and the second AP device is a target AP device to be associated with the STA device.

6. The STA device of claim 5, wherein the first request frame is a Fast basic service set Transition (FT) request frame.

7. The STA device of claim 5, wherein the first request frame comprises an NSEP priority access permission transfer request element which is configured to carry the first indication information; or
the first request frame comprises an NSEP priority access permission transfer request field which is configured to carry the first indication information.

8. The STA device of claim 7, wherein the first request frame is a Fast basic service set Transition (FT) request frame, and an FT request frame body of the FT request frame comprises the NSEP priority access permission transfer request element or the NSEP priority access permission transfer request field.

9. The STA device of claim 5, wherein the first request frame comprises an EDCA parameter set request element which is configured to carry the second indication information; or
the first request frame comprises an EDCA parameter set request field which is configured to carry the second indication information.

10. The STA device of claim 9, wherein the first request frame is a Fast basic service set Transition (FT) request frame, and an FT request frame body of the FT request frame comprises the EDCA parameter set request element or the EDCA parameter set request field.

11. The STA device of claim 5, further comprising:
a transceiver,
wherein the transceiver is configured to receive a first response frame sent by the first AP device, wherein the first response frame comprises at least a target status code or a target EDCA parameter set, and the target status code is configured to indicate a transfer result of the NSEP priority access permission of the STA device.

12. The STA device of claim 11, wherein the first response frame is a Fast basic service set Transition (FT) response frame.

13. The STA device of claim 11, wherein the first response frame comprises an NSEP priority access permission transfer response element which is configured to carry the target status code; or the first response frame comprises an NSEP priority access permission transfer response field which is configured to carry the target status code.

14. The STA device of claim 13, wherein the first response frame is a Fast basic service set Transition (FT) response frame, and an FT response frame body of the FT response frame comprises the NSEP priority access permission transfer response element or the NSEP priority access permission transfer response field.

15. The STA device of claim 11, wherein the first response frame comprises an EDCA parameter set element which is configured to carry the target EDCA parameter set; or
the first response frame comprises an EDCA parameter set field which is configured to carry the target EDCA parameter set.

16. The STA device of claim 15, wherein the first response frame is a Fast basic service set Transition (FT) response frame, and an FT response frame body of the FT response frame comprises the EDCA parameter set element or the EDCA parameter set field.

17. An Access Point (AP) device, comprising:
a memory; and
a processor,
wherein the processor is configured to:
acquire National Security and Emergency Preparedness (NSEP) priority access service information of a station (STA) device; and
determine
dot11NonAPStationAuthNSEPPriorityAccesstype of the STA device in dot11InterworkingEntry according to the NSEP priority access service information of the STA device.

18. The AP device of claim 17, wherein the dot11NonAPStationAuthNSEPPriorityAccesstype comprises at least one of:
first information, configured to indicate whether the STA device has an NSEP priority access authority;
second information, configured to indicate whether the STA device has an NSEP priority access authority of a non-Multi-Link Device (MLD) identity;
third information, configured to indicate whether the STA device has an NSEP priority access authority of an MLD identity; or
fourth information, configured to indicate priority information of NSEP priority access of the STA device.

19. The AP device of claim 18, wherein a data type of the first information is one of a Truth Value, BOOL, BITS, or an INTEGER.

20. The AP device of claim 18, wherein the processor is further configured to:
set a value of the first information as a first value in case that it is determined that the STA device has the NSEP priority access authority according to the NSEP priority access service information of the STA device, the first value being configured to indicate that the STA device has the NSEP priority access authority; or
set the value of the first information as a second value in case that it is determined that the STA device does not have the NSEP priority access authority according to the NSEP priority access service information of the STA device, the second value being configured to indicate that the STA device does not have the NSEP priority access authority.

* * * * *